US012658174B1

(12) United States Patent
Li et al.

(10) Patent No.: US 12,658,174 B1
(45) Date of Patent: Jun. 16, 2026

(54) SPEECH SYNTHESIS WITH ROBUSTNESS AGAINST INPUT VARIATION

(71) Applicant: Amazon Technologies, Inc., Seattle, WA (US)

(72) Inventors: Yang Li, Bishop's Stortford (GB); Mateusz Aleksander Lajszczak, Cambridge (GB); Fatih Beyhan, Cambridge (GB); Bartosz Putrycz, Gdansk (PL); Elena Sergeevna Sokolova, London (GB)

(73) Assignee: Amazon Technologies, Inc., Seattle, WA (US)

( * ) Notice: Subject to any disclaimer, the term of this patent is extended or adjusted under 35 U.S.C. 154(b) by 243 days.

(21) Appl. No.: 18/478,328

(22) Filed: Sep. 29, 2023

(51) Int. Cl.
*G10L 13/10* (2013.01)
*G10L 13/047* (2013.01)

(52) U.S. Cl.
CPC ............ *G10L 13/10* (2013.01); *G10L 13/047* (2013.01)

(58) Field of Classification Search
None
See application file for complete search history.

(56) References Cited

U.S. PATENT DOCUMENTS

2020/0135179 A1* 4/2020 Yang ........................ G06F 3/167
2020/0320982 A1* 10/2020 Larson ................... G06N 20/00
2020/0357390 A1* 11/2020 Bromand ................ G10L 13/00
2022/0246132 A1* 8/2022 Zhang .................... G10L 15/063
2023/0133030 A1* 5/2023 Bittmann ............ G06F 18/2411 382/159
2023/0206898 A1* 6/2023 Stanton ................. G10L 13/027 704/260
2024/0194178 A1* 6/2024 Austraat ................. G10L 15/16

* cited by examiner

*Primary Examiner* — Daniel C Washburn
*Assistant Examiner* — Tyler Becker
(74) *Attorney, Agent, or Firm* — Pierce Atwood LLP

(57) ABSTRACT

A speech synthesis system may be configured to be robust against variations and errors in spelling and/or punctuation in the input text. A text modifier may generate a parallel training dataset by modifying text from a training dataset to include variations in spelling, punctuation, and/or formatting. The speech synthesis system may generate synthesized speech based on the modified text in the parallel training dataset. A robustness tester may compare audio from the original training dataset with synthesized speech generated using the modified text. The results may be used to update parameters of one or more speech generation models of the speech synthesis system. The results may also be used to adjust the frequency of modifications generated by the text modifier to, for example, ensure that performance of the speech synthesis system on unmodified text is not adversely affected by the training using the modified text.

20 Claims, 14 Drawing Sheets

SPEECH SYNTHESIS WITH ROBUSTNESS AGAINST INPUT VARIATION

BACKGROUND

A speech-synthesis system may process input data such as text and/or other representations of written natural language to determine output data that includes a representation of speech. The input data may include content from one or more of a book, magazine, website, movie subtitles, message from another user, system generated prompt, etc. A user device such as a computer, handheld system, kiosk, etc., may output the speech as an audible signal from a loudspeaker, headphones, earbuds, etc.

BRIEF DESCRIPTION OF DRAWINGS

For a more complete understanding of the present disclosure, reference is now made to the following description taken in conjunction with the accompanying drawings.

DETAILED DESCRIPTION

Figure 1A:
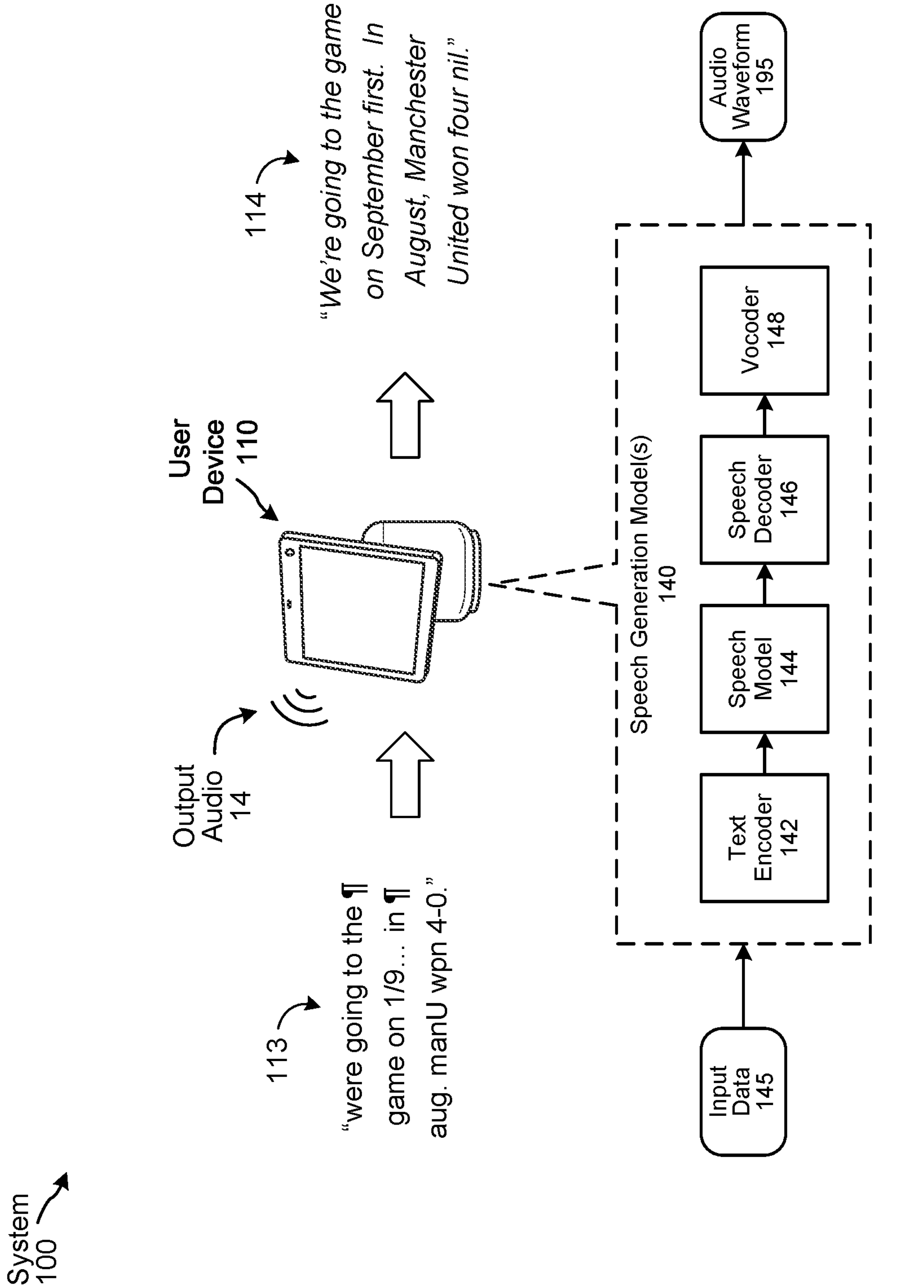
FIG. 1A is a conceptual diagram illustrating an example of generating synthesized speech from noisy content, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Natural Language Generation (NLG) includes enabling computers to generate output text or other data in words a human can understand, such as sentences or phrases. Text-to-speech (TTS) is a field of computer science concerning transforming textual and/or other data into audio data that is synthesized to resemble human speech. ASR, NLU, NLG, and TTS may be used together as part of a speech-processing/virtual assistant system that can communicate with a user by processing spoken inputs and responding with synthesized speech. A speech-processing system may additionally receive other inputs and provide other outputs.

The speech processing system may perform actions for and/or on behalf of users. For example, the speech processing system may "read" text content to a user by synthesizing speech. While some content may be carefully edited (e.g., books, articles, etc.) for proper punctuation and grammar, other content may contain relatively high amounts of typos, misspellings, non-standard spellings, non-standard punctuation, formatting, etc., and/or may represent casually written messages or comments such as may be conveyed by text messages, posted on internet fora, and the like. Synthesized speech generated from content that includes such variations or errors may sound unnatural and may even be unintelligible.

Offered herein are techniques for training and using speech generation models to be robust against variations and/or errors in spelling, punctuation, capitalization, and/or formatting. The techniques may further allow speech generation models to output content in an intuitive way by, for example, accounting for acronyms and abbreviations as well as the various possible formats for expressing numbers (e.g., cardinal numbers, dates, times, game scores, etc.). The resulting models may thus generate intelligible and meaningful outputs for a broad range of input type and quality. For example, the system may read a portable document (pdf) file to the user. To the system, the book may appear to have truncated sentences from the placement of line breaks within sentences as the text wraps at the end of each line. Accordingly, the speech generation models may be trained to disregard mid-sentence line breaks when determining pronunciation of the adjacent words. In another example, the system may read a text message to the user. The text message may be written casually with abbreviations and/or non-standard punctuation. The system may read out the long form of the abbreviated word(s) and disregard punctuation variations not intended to affect pronunciation (e.g., ellipses with extra periods, missing apostrophes, etc.). In yet another example, the system may read out dates and or times written numerically. Thus, the system may convert "1/9" to "September first" and "14:30" to "two thirty p.m.", etc.

To train the speech generation models to be robust against such noisy inputs, the system may include a text modifier configured to generate a parallel training dataset by introducing variations in spelling, punctuation, and/or formatting. The system may include a TTS robustness tester configured to compare synthesized speech generated from the original text to that from the modified text. The system may use the output of the TTS robustness tester to update one or more speech generation models to map the modified input to good output speech. The system may further use the output of the TTS robustness tester to adjust the modification frequency implemented by the text modifier (e.g., control how many variations/errors to introduce per length of content).

These techniques may offer several benefits to the speech synthesis system. First, it does not require additional manual annotation of data to operate since the modified dataset and ground truths may be generated automatically from an existing dataset. Second, the updated speech generation model(s) may exhibit improved performance when the input text is noisy (e.g., includes errors and variations from common usage). Third, the speech generation model(s) may need no extra parameters. Finally, the updated speech model may partially or wholly obviate the need for separate text normalization, which may simplify the speech generation system, improve efficiency, decrease latency, and/or increase throughput.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A is a conceptual diagram illustrating an example of generating synthesized speech from noisy content using a speech synthesis system 100 configured with improved robustness against input variations, according to embodiments of the present disclosure. Sources of content (e.g., input data 145) for the speech synthesis system 100 may come from myriad sources including books, documents, user messages, movie subtitles, system-generated prompts, magazine articles, websites, etc. The input data 145 may represent a broad range of content type and/or quality, from books published by major houses to casual text messages and web forum comments. Thus, the system 100 may often encounter "noisy" inputs that include variations, typos, and/or errors in spelling and/or punctuation. Other challenging inputs may include abbreviations, acronyms, and various number formats (e.g., date formats, digit substitutions such as "oh" for "zero", etc.). In addition, the input data 145 may include formatting issues that may not affect the pronunciation of the word(s) and/or adjacent words; for example, errant letter cases, mid-sentence line breaks, etc.

FIG. 1A includes an example of such noisy content 113 "were going to the ¶ game on 1/9 . . . in aug. manU wpn 4-0." The content 113 may include errors of formatting (lowercase "w" and "I" at the beginning of sentences and sentence truncation caused by line breaks ("¶" symbols)), punctuation (a missing apostrophe in "we're"), number formatting (a date expressed in "day/month" form and a game score), abbreviations ("aug." and "manU"), typos ("wpn" instead of "won"), etc. They system 100 may include one or more speech generation models 140 configured to receive input data 145 such as the content 113 and generate audio waveform data 195 such as the synthesized speech 114. The system 100 may include a user device 110 that may present the audio waveform data 195 to a user as output audio 14. The synthesized speech 114 may reflect the intended recitation of the content 113 with variations and errors accounted for: "We're going to the game on September first. In August, Manchester United won four nil."

The system 100 may be configured to account for such noisy inputs through training of one or more of the various speech generation models 140. For example, in some implementations, the system 100 may include a text encoder 142, a speech model 144, a speech decoder 146, and/or a vocoder 148, etc., which may operate as described in further detail below with reference to FIG. 4. One or more of these models may be trained using a parallel training dataset created by taking the original training dataset, which may include high-quality audio data representations of speech and input data representing transcripts of that speech. The input data of the original training dataset may be highly sanitized or curated to include few, if any, errors and/or variations of the types enumerated above. However, the system 100 may use a content modifier to introduce variations into the input data. Thus, the system 100 may create the parallel training dataset by keeping the original audio data but generating "corrupted" input data from the original input data.

Figure 1B:
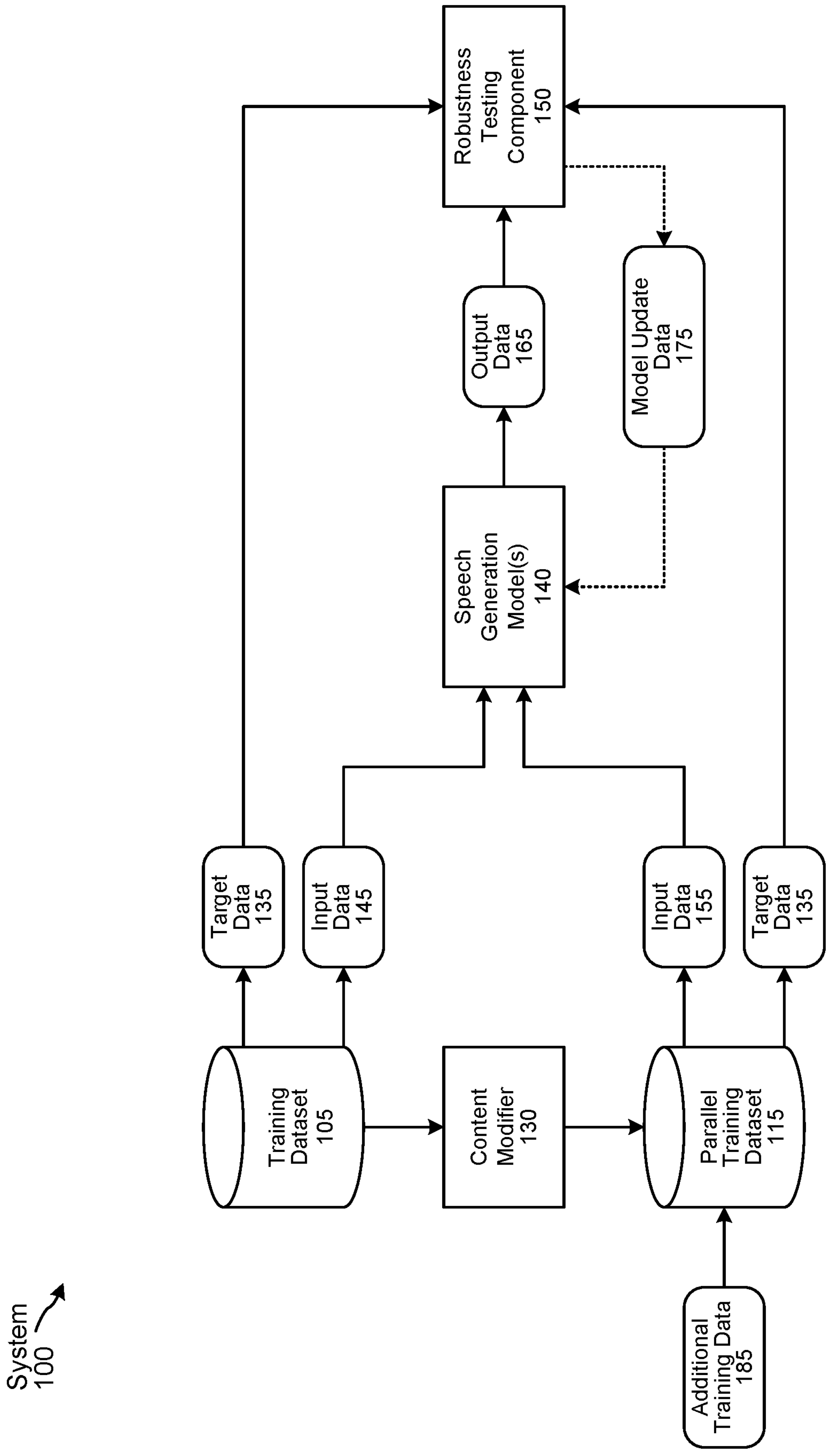
FIG. 1B is a conceptual diagram illustrating example operations of configuring a speech synthesis system to be robust against errors and variations in input, according to embodiments of the present disclosure.

FIG. 1B is a conceptual diagram illustrating example operations of configuring a speech synthesis system 100 to be robust against errors and variations in input, according to embodiments of the present disclosure. The system 100 may use a content modifier component 130 to generate a parallel training dataset 115 from a training dataset 105. The training dataset 105 may contain target data 135 representing speech sample audio and input data 145 representing a transcript of the speech. The parallel training dataset 115 may include input data 155 that has been modified from the original input data 145; for example, by changing spelling, punctuation, capitalization, formatting, etc. The content modifier component 130 is described in further detail below with reference to FIG. 3. The target data 135, however, may remain the same. In this manner, the system 100 may train one or more speech generation model(s) 140 to generate synthesized speech that is intelligible and appropriate for the content of input data, even if that input data includes errors and/or other variations from standard or common usage.

In some implementations, the speech generation model(s) 140 may be trained in stages: first using the training dataset 105 and second using the parallel training dataset 115. In some implementations, the speech generation model(s) 140 may be trained using both datasets 105 and 115 simultaneously or interleaved (e.g., by alternating between training datasets after processing one or a number of samples from a dataset). The speech generation model(s) 140 may process the input data 145 and/or input data 155 to generate output data 165. In various implementations, the output data 165 may represent the acoustic features of speech. For example, in some implementations, the output data 165 may represent audio data (e.g., spectrogram or waveform data). In some implementations, the output data 165 may represent speech tokens, which may represent the content (e.g., words) and pronunciation (e.g., prosody) of speech. Speech tokens may represent an intermediate representation between words or phonemes on the one hand and audio data on the other. The use of speech tokens by the speech generation model(s) 140 is described further below with reference to FIG. 4.

In some implementations, the reference audio data 415 may be supplemented with additional annotated training data 185. The additional annotated training data 185 may be created based on samples that in the original training dataset 105 that the system 100 struggles with; that is, input data 145 for which the robustness testing component 150 calculates relatively low accuracy scores. This may include, for example, text written in all caps, abbreviations or acronyms, meaningless unpronounceable text (e.g., "key mashing"), statements with emotional undertones that the system 100 may not recognize/reconstruct without additional training, etc. In some cases, the content modifier component 130 may generate such samples; in other cases, however, they may be provided manually.

A robustness testing component 150 may compare the output data 165 with the target data 135 and generate model update data 175, which may be used to update one or more of the speech generation model(s) 140. The robustness testing component 150 may include a combination of hardware and/or software configured to compare output data and target data, calculate the result of one or more loss functions, calculate gradients for updating parameters of one or more neural networks, and backpropagate model update data 175 through the one or more neural networks. The type of loss function applied may depend on the type of output data and/or target data compared. For example, in the case of speech token data, the robustness testing component 150 may compare speech tokens in the output data 165 with speech tokens in the target data 135 using cross-entropy loss. In some implementations, speech tokens may be generated from audio data using a speech tokenizer such as the speech tokenizer 440 described below with reference to FIGS. 4 and 5. In some cases, the output data 165 and the target data 135 may be audio data such as Mel-spectrograms, in which case the robustness testing component 150 may compare the output data and target data using mean square error (MSE).

Figure 2:
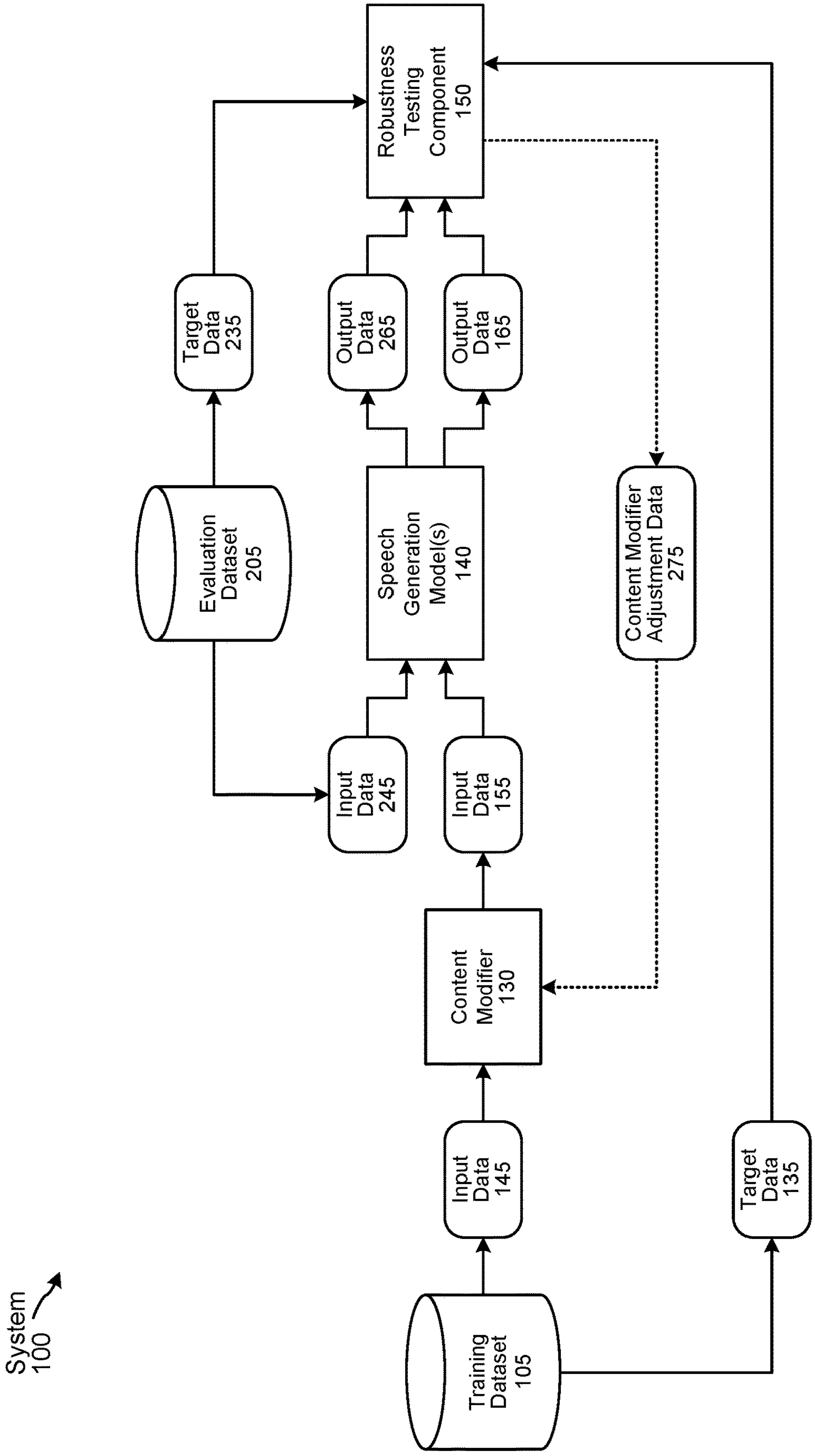
FIG. 2 is a conceptual diagram illustrating example operations of adjusting the operation of a content modifier component of the system, according to embodiments of the present disclosure.

In addition to generating and propagating model update data 175 back through the speech generation model(s) 140, the robustness testing component 150 may also adjust the amount and/or type of modification performed by the content modifier component 130. FIG. 2 is a conceptual diagram illustrating example operations of adjusting the operation of a content modifier component 130 of the system, according to embodiments of the present disclosure. The content modifier component 130 may be adjusted to generate variations/errors in varying amounts from 0% and theoretically up to 100%. Training data that is modified 100% would have little value for training the speech generation model(s) 140, however, due to having no relation left to the original training data. Thus, the robustness testing component 150 may be configured to evaluate performance of the model(s) 140 based on various factors such as a trend in the loss functions (e.g., whether the model(s) 140 become difficult to update and/or cease to improve through further training) and/or based on evaluation using a benchmark and/or evaluation training dataset different from the datasets 105 and/or 115 (e.g., to prevent an increase in development loss resulting from processing unmodified input data 145). In other words, the general quality of synthesized speech generated by the system 100 should not suffer based on the robustness training. In some implementations, a modification amount between 5% and 20% (e.g., measured by the number of modified characters including formatting characters) may yield the best results. In some cases, the exact amount may be relatively higher or lower and/or cover a larger or smaller range. Thus, based on evaluation of the output data 165 over time and/or using benchmarks, the robustness testing component 150 may generate content modifier adjustment data 275 that may signal to the content modifier component 130 to increase/decrease the amount of modification overall and/or with respect to certain types of modifications (e.g., spelling versus punctuation).

The speech generation model(s) 140 may be evaluated using an evaluation dataset 205 including input data 245 and target data 235. The speech generation model(s) 140 may process the input data 245 and generate output data 265, which the robustness testing component 150 may compare to the target data 235 using, for example, a cross-entropy loss, MSE, or other loss function. The loss function applied may depend on the data type of the output data 265 (e.g., whether the data includes speech tokens or spectrograms, etc.). In some implementations, the evaluation dataset 205 may be the same as the training dataset 105. In some implementations, a first portion (e.g., 75%) of the training dataset 105 may be used for training the speech generation model(s) 140 and a second portion (e.g., 25%) may be used as the evaluation dataset 205. The system 100 may evaluate updated speech generation model(s) 140 occasionally, periodically, and/or after one or several training operations. The robustness testing component 150 may compare the loss exhibited by the speech generation model(s) 140 at each training iteration. If the loss decreases (e.g., model performance improves), the updated speech generation model(s) 140 may be retained. If, however, the loss increases (e.g., model performance decreases), the system 100 may revert to the previous version speech generation model(s) 140. The previous version of the speech generation model(s) 140 may be trained using a modified input data 155 having fewer modifications. The robustness testing component 150 may send content modifier adjustment data 275 to the content modifier component 130 indicating to the content modifier component 130 to reduce the frequency of modification of the input data 145. The speech generation model(s) 140 may be trained/updated using the new, less corrupted input data, and evaluated again, and so on.

Figure 3:
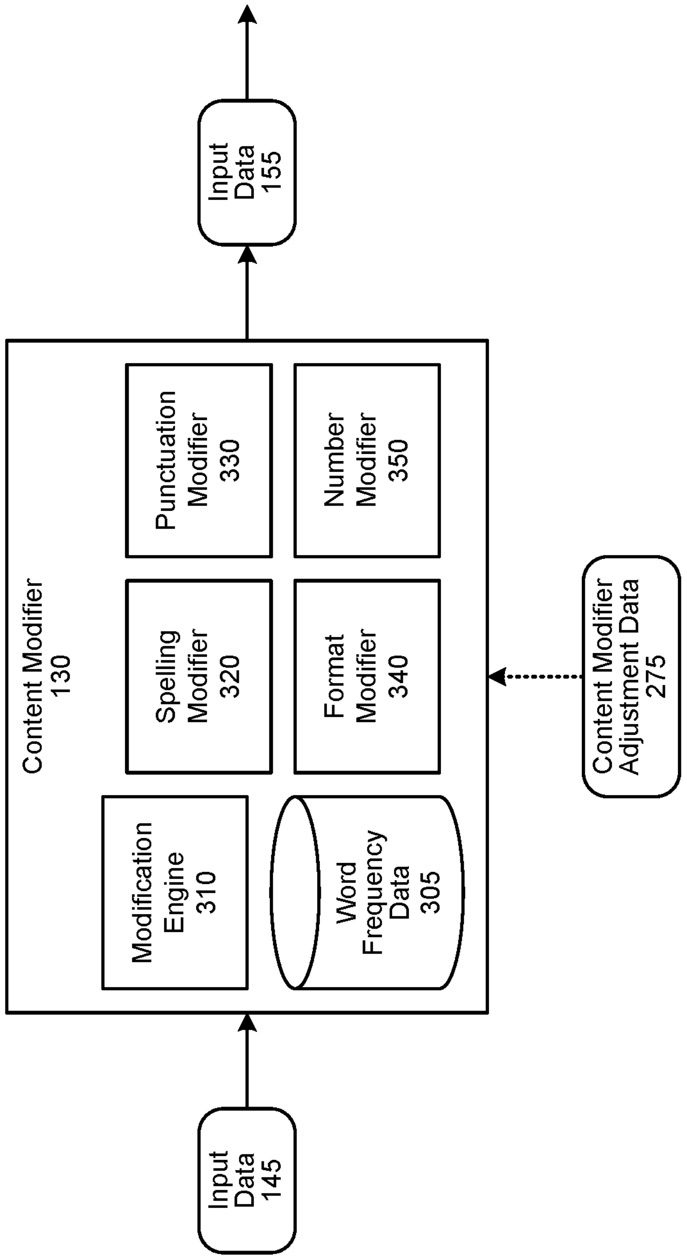
FIG. 3 is a conceptual diagram of a content modifier component, according to embodiments of the present disclosure.

FIG. 3 is a conceptual diagram of a content modifier component 130, according to embodiments of the present disclosure. The content modifier component 130 may include a combination of hardware and/or software configured to receive the original input data 145 and output modified input data 155. The content modifier component 130 may adjust the amount and or type of modification based on content modifier adjustment data 275 generated by the robustness testing component 150. The content modifier component 130 may include various internal components for generating different types of modifications. For example, a modification engine 310 may determine the amount of modification and/or the locations of modifications (e.g., which words to change, where to insert a line break, where to replace a word or number a different form such as an abbreviation or roman numeral, etc.) In some implementations, the modification engine 310 may retrieve word frequency data from a word frequency data storage component 305. In various implementations, the content modifier component 130 may modify common/rare words more/less frequently depending on the desired results.

The content modifier component 130 may include a spelling modifier 320 that may add, delete, and/or replace letters from words in the input data 145. In some implementations, the spelling modifier 320 may modify words randomly. In some implementations, the spelling modifier 320 may modify words based on, for example, a dataset of commonly misspelled words and/or typos such as a spell-check or autocorrect library. In some implementations, the database of commonly misspelled words may be stored in the word frequency data storage component 305 or similar storage component. Using a database of commonly misspelled words may improve the overall training process by allowing the content modifier component 130 to avoid random modifications that may occasionally result in a different word with a different pronunciation. Such a database may include common typos/misspellings including "teh" instead of "the," "adn" instead of "and," etc. The database of commonly misspelled words may in some cases include typos that would result in different words with different pronunciations; however, the speech generation model(s) 140 may be powerful enough to be trained to recognize based on context (e.g., adjacent words and/or the rest of the sentence) when such a word is likely to represent a different word and should be pronounced accordingly. For example, the model(s) may be able to account for errors such as "every" in place of "ever," "out" in place of "our," various instances of there/their/they're, etc. In an example operation, the content modifier component 130 may identify a word of the content to modify. The spelling modifier 320 may determine a variant of that word. The content modifier component 130 may then generate the input data 155 by using the word variant in place of the original word from the input data 145 (e.g., the word variant replaces the original word in the input data 145 in such a way that the word variant still substantially aligns with the corresponding speech in the target data 135). In some cases, the punctuation errors may result in misspelled and/or misused words; for example, improper or omitted apostrophes such as in "you're" versus "your," "were" versus "we're," "it's" versus "its," etc., may change the meaning and/or pronunciation of the word. The spelling modifier 320 may modify punctuation of content in the input data 145 to generate training data for configuring the speech generation model(s) 140 to accurately interpret errant and/or absent apostrophes, hyphens, and/or other punctuation marks. Some natural languages include accents whose addition or omission may change the meaning of a word in addition to its pronunciation. Thus, in some implementations, the spelling modifier 320 may modify accents and/or other auxiliary characters or marks to generate accent-based typos and/or misspellings that the speech generation model(s) 140 may encounter.

The content modifier component 130 may include a punctuation modifier 330. The punctuation modifier 330 may generate modifications that represent common punctuation mistakes and/or liberties taken with punctuation in casual speech. This may include ellipses added for pauses or inflection rather than a truncated quote. In addition, the number of periods in the ellipses should not affect pronunciation; that is, a pause or hesitation associated with five periods should be the same as that for three periods. As with spelling modifications, punctuation modifications should not affect pronunciation. Other examples of modifications that do not affect pronunciation may include randomly inserted line breaks, column breaks, and/or page brakes that may remain in text scraped from the Internet/World Wide Web, documents in .pdf format, and/or scans of book pages, etc. Similarly, commas and/or apostrophes may be added to and/or after random words in the input data 145.

The content modifier component 130 may include a format modifier 340. The format modifier 340 may apply different formats to words or sections of the input text 145. The formatting modifications may include generating all uppercase text (e.g., to a random word, phrase, or sentence and/or to a sentence that ends with an exclamation point). The formatting modifications may include changing uppercase text to lowercase text (e.g., the pronunciation of a name or a first word of a sentence should not change based on capitalization). In some cases, however, capitalization and/or other formatting such as bold, italics, parentheticals, quotes, etc. may affect pronunciation or may not. The format modifier 340 may be configured to only make modifications that would generally not affect pronunciation, or may be configured to work in concert with a prosody model or other speech model to train the model(s) 140 to generate appropriate inflection for different formats of text.

The content modifier component 130 may include a number modifier 350. Rather than introduce typos or errors into numbers represented in the input data 145, the number modifier 350 may vary the presentation of the numbers. For example, the number modifier 350 may change written numbers to enumerated numbers (e.g., "forty-two" becomes "42", or "first" becomes "1$^{st}$"). This feature may be particularly useful if the training dataset 105 was generated with the use of automatic speech recognition (ASR), which tends to transcribe speech with numbers written out. Training the speech model(s) 140 in this manner may be helpful especially for learning conventions such as when a number may be spoken properly (e.g., "one thousand, two hundred, and thirty-four") versus two digits at a time (e.g., "twelve thirty-four"). The number modifier 350 may generate dates in different formats (e.g., "three pea em" becomes "3:00 pm" and "oh three hundred hours" becomes "0300," etc.). The number modifier 350 may generate dates in different formats (e.g., "Sep. 19, 2023" may become "09-19-2023," "2023-09-19," etc.).

The content modifier component 130 may perform other modifications as well, including replacing certain words, names, and/or phrases with their common abbreviations or acronyms. The content modifier component 130 may also generate sentence fragments. A truncated sentence may not result in a different pronunciation (for example, if the truncation is due to errant/missing punctuation). Thus, the content modifier component 130 may randomly truncate sentences by removing one or more words from the end of the sentence. The content modifier component 130 may also edit the target data 135 audio to match a portion of the sentence corresponding to the truncated input data 155 (e.g., so that the truncated sentence is mapped to the correct portion of speech rather than to the original complete sentence).

Figure 4:
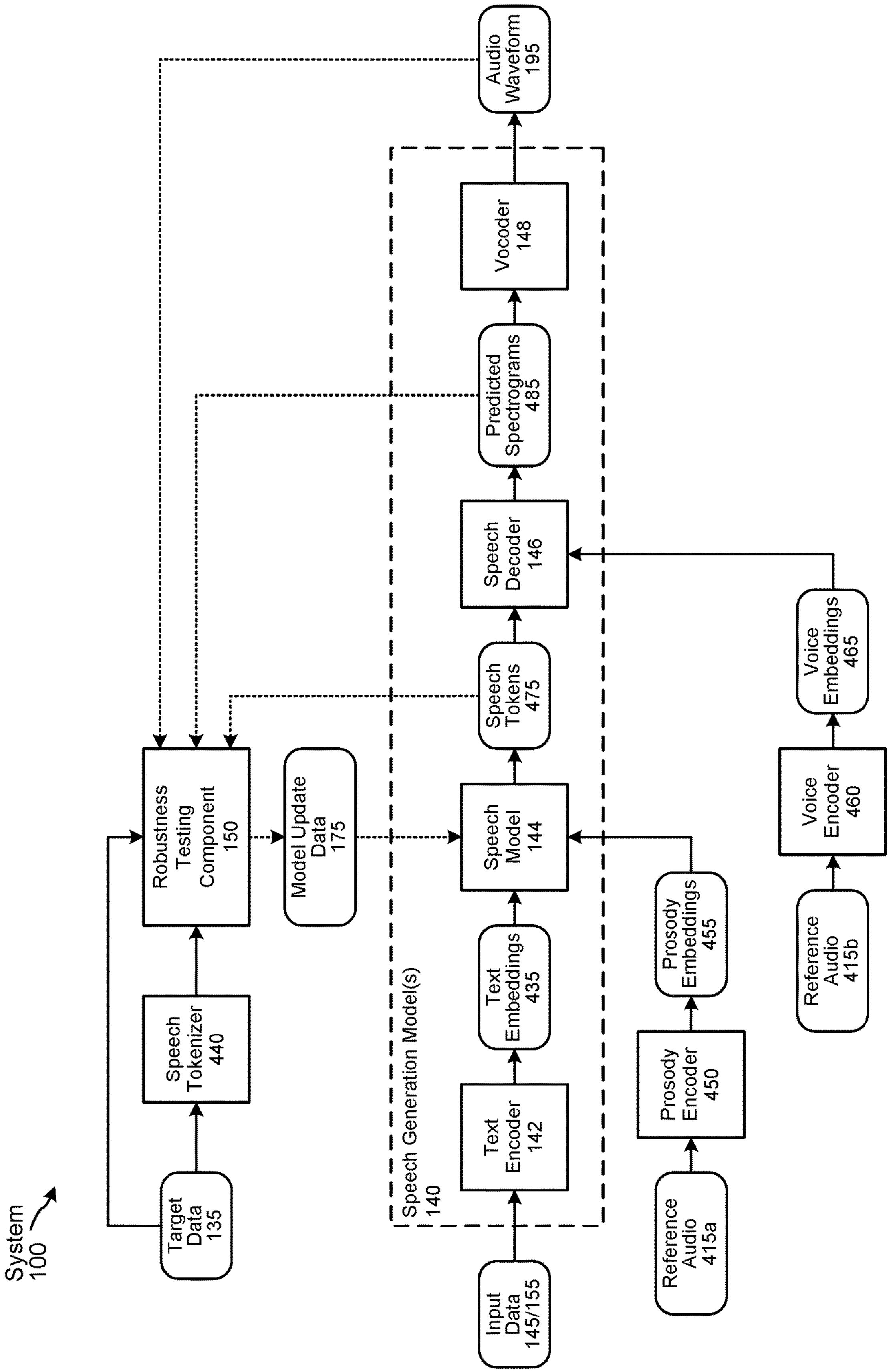
FIG. 4 illustrates the speech synthesis system and training operations in further detail, according to embodiments of the present disclosure.
Figure 8:
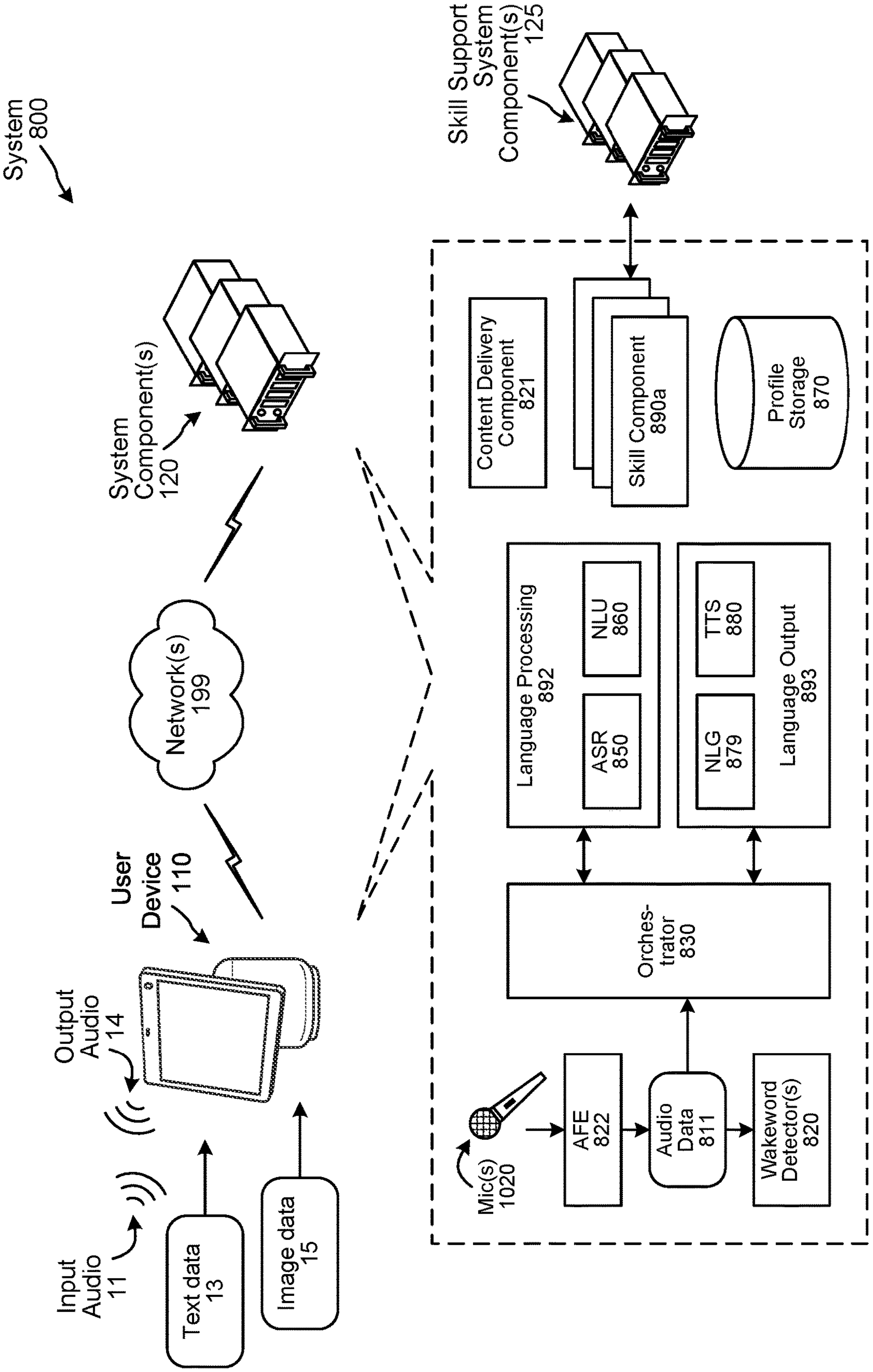
FIG. 8 is a conceptual diagram of components of a speech processing system that incorporates the speech synthesis system, according to embodiments of the present disclosure.

FIG. 4 illustrates the speech synthesis system 100 and training operations in further detail, according to embodiments of the present disclosure. The speech synthesis system 100 may receive a representation of written language (e.g., the input data 145 and/or 155) and generate synthesized speech (e.g., audio waveform data 195) for output to a user using one or more speech model(s) 140. The input data 145/155 may represent data from one of the training datasets 105 and/or 115 or from some other source. The input data 145/155 may represent content derived from myriad sources including books, web pages, messages, emails, articles, the output of a machine translation process, recognized from image data, etc. The input data 145/155 maybe represent characters and/or words conveying natural language and may be received in various forms and/or formats including ASCII (American Standard Code for Information Interchange), Unicode (Universal Code Character Set), UTF-8 (Unicode Transformation Format), word segments, phonemes, encoded embeddings (e.g., latent representations), and/or tokens, etc. In some implementations, the speech synthesis system 100 may be embodied in a TTS component 880 as part of a natural language command processing system 800 ("system 800") as shown in FIG. 8. A user may interact with the system 800 using one or more modes of input including voice, text, or visual inputs, etc. The system 800 may respond using one or more modes of output such as synthesized speech or a visual display, and/or by performing other actions for and/or on behalf of the user such as streaming media, communicating with other users, actuating smart home or vehicle features, shopping, gaming, driving directions, and the like. By processing spoken commands and responding with synthesized speech, the system 800 may provide an intuitive and convenient interface for myriad online and offline services.

In some implementations, speech model(s) 140 may include a text encoder 142, a speech model 144, a speech decoder 146, and/or a vocoder 148. The text encoder 142 may process the input data 145/155 to generate text embedding data 435. The speech model 144 may process the text embedding data 435 to generate speech token data 475. The speech token data 475 may represent the content (e.g., words) and prosody of speech. Prosody may refer to elements of speech that are not individual phonetic segments (e.g., vowels and consonants) but which may refer to the expressive features of speech such as stress, intonation, emotional tone, pace, etc.). Thus, the speech token data may be an intermediate representation of speech between text and audio. A speech token may correspond to a portion of audio (e.g., one frame or a few frames of audio data). The speech tokens may represent discrete representations of the content and prosody of the speech to be synthesized. For example, in some implementations, a speech token may be an integer having a value between 0 and 8191. In some implementations, the value may be between 0 and 2,047, 4095, 16,383, 32,767, or other number. Relatively smaller numbers may encode less information and yield lower quality speech and/or require a higher sampling rate (e.g., fewer frames of audio data per speech token). Relatively larger number may require more computing resource to predict/process with marginally decreasing improvements in speech quality. The system may "learn" the speech tokens in an autoencoding manner where audio data representing speech is encoded into speech embeddings, which are then quantized into speech tokens, which are then decoded into audio data representing synthesized speech. Example operations for training the system 100 to learn speech tokens is described in additional detail below with reference to FIG. 5.

The speech model 144 may be a neural network with an architecture similar to a large language model (LLM). For example, an LLM may be a transformer-based seq2seq model involving an encoder-decoder architecture. In an encoder-decoder architecture, the encoder may produce a representation of an input (e.g., audio, text, image, video, etc.) using a bidirectional encoding, and the decoder may use that representation to perform a task. In some such embodiments, an LLM may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the LLM may be pre-trained for approximately 1 trillion tokens. Being trained on CLM tasks, an LLM may be capable of in-context learning. An example of such a LLM is Alexa Teacher Model (Alexa™). Other examples of LLMs include BigScience Large Open-science Open-access Multilingual Language Model (BLOOM), Language Model for Dialogue Applications model (LaMDA), Bard, Large Language Model Meta AI (LLaMA), Titan Foundational Model, etc.

In some other embodiments, an LLM may have a decoder-only architecture. The decoder-only architecture may use left-to-right (unidirectional) encoding of the input (e.g., audio, text, image, video, etc.). An example of such a LLM is the Generative Pre-trained Transformer 3 (GPT-3) and other versions of GPT. GPT-3 has a capacity of (approximately) 175 billion machine learning parameters. The speech model 144 may model both text and speech. For example, the speech token data 475 may convey both the content (e.g., words) as well as pronunciation (e.g., prosody).

Figure 6:
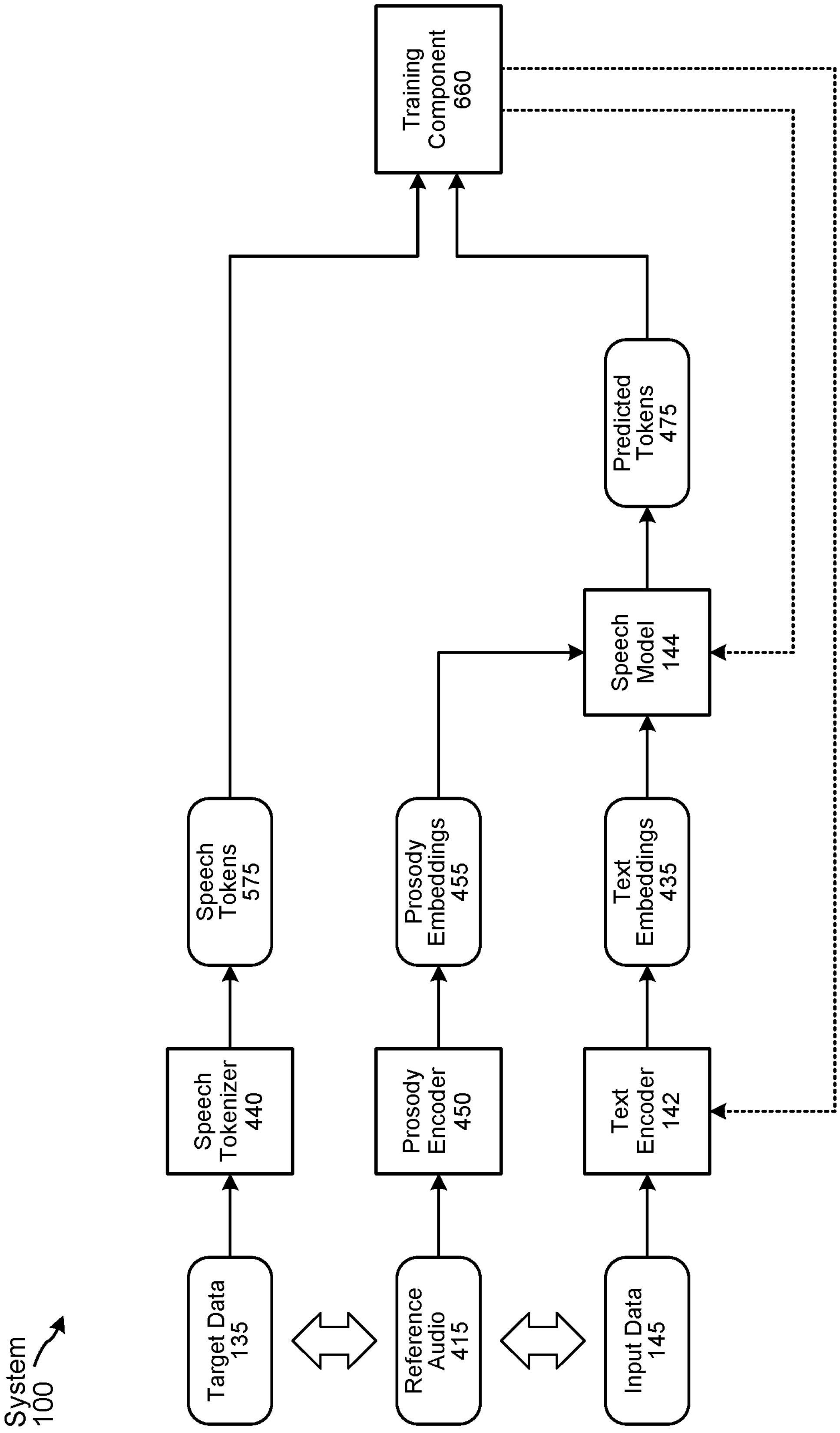
FIG. 6 is a conceptual diagram illustrating example operations for training a speech model of the system, according to embodiments of the present disclosure.

In some implementations, the speech model 144 may operate in an autoregressive manner to predict a variable or variables in a sequence that depends in part on previously predicted variables in the sequence. Thus, a speech token predicted by the speech model 144 may become an input of the speech model 144 when predicting the next speech token in the sequence. In some implementations, the speech model 144 may operate in a non-causal (e.g., non-autoregressive) manner where inputs are processed bi-directionally to generate the outputs, but the outputs are not causally related to previously predicted outputs. Whether operating in an autoregressive or non-causal manner, the speech model 144 may implement a self-attention mechanism where a predicted speech token of an output sequence of predicted speech token data 475 is determined not only based on the corresponding text embedding of an input sequence of text embedding data 435, but on some or all of the text embeddings in the input sequence of text embedding data 435, including text embeddings that are distant in the input sequence. Thus, the words and pronunciation represented in the predicted speech token data 475 may depend on In some implementations, the speech model 144 may be trained as shown in FIG. 6 and described in additional detail below.

In an example runtime operation, the system 100 may receive content in the form of input data 145/155 for use in generating synthesized speech. A text encoder 142 may generate text embedding data 435 that represents the content of the input data 145/155 (e.g., words and/or phonemes, etc.) in a form suitable for processing by the speech model 144. The text encoder 142 may be a machine learning component such as a neural network encoder. The text encoder 142 may be trained in concert with the speech model 144 to generate the speech token data 475 (e.g., as described below with reference to FIG. 6). The speech model 144 may receive the input data 145/155 and process it to predict the speech token data 475.

In some implementations, the speech model 144 may receive and process prosody embedding data 455 as a conditioning input when generating the speech token data 475. The speech model 144 may thus imbue the speech token data 475 with the prosodic features conveyed in the prosody embedding data 455. The prosody embedding data 455 may be generated by a prosody encoder 450. The prosody encoder 450 may be, for example, a neural network encoder configured to extract prosodic features from reference audio data 415 representing speech. In some cases, the reference audio data may be taken from the target data 135 and/or from the training dataset 105; however, the reference audio data 415 need not correspond to the input data 145/155 and may correspond to a different speaker or no human speaker at all (e.g., synthesized). The prosody embedding data 455 may represent prosodic features represented in a particular speaking style, such as stress, intonation, emotional tone, pace, etc. The prosody embedding data 455 may affect pronunciation and various levels of scale. For example, the prosody embedding data 455 may relate to how individual phonemes are pronounced, how words/phrases/clauses are intonated, and/or how sentences or multiple sequential sentences are delivered. The prosody embedding data 455 may convey prosody information at various levels of granularity. For example, the prosody embedding data 455 may be generated for individual phonemes, subwords, words, phrases, clauses, sentences, and/or paragraphs or longer. The prosody embedding data 455 may reflect the mood or emotion of content such as happy and animated or somber and monotone, etc. In some cases, the prosody embedding data 455 may represent the speaking style of an individual, a particular accent or regional dialect, or an average or typical speaking style of a particular natural language. In some cases, however, the prosody embedding data 455 may not convey (or convey only small amounts of) information related to speaker-dependent voice characteristics such as timbre of various phonemes. Such voice characteristics may instead be conveyed by voice embedding data 465 as described below.

In some implementations, the prosody encoder 450 may be a transformer neural network such as a vision transformer (ViT). A vision transformer may receive a sequence of vectors generated from fixed-size patches of an image and predict a classification. A position embedding may be added to the vectors, and a classification token may be added to the sequence to cause the prosody encoder 450 to output a classification of the input data. Rather than processing images, however, the prosody encoder may process spectrogram data (e.g., Mel-spectrograms) representing frequency content of an audio waveform over time.

In some implementations, the prosody encoder 450 may be trained using, for example, contrastive learning such that the prosody encoder generates prosody embedding data 455 that are close (e.g., as measured using cosine similarity) for respective clips of reference audio data 415 corresponding to a same prosodic style, but that are distant for respective clips of reference audio data 415 corresponding different prosodic styles. In some implementations, the prosody encoder 450 may be trained in conjunction with the text encoder 142 and/or speech model 144 as shown in FIG. 6.

The speech decoder 146 may receive the speech token data 475 and process it to generate the predicted spectrogram data 485 representing the synthesized speech. The speech decoder 146 may be a machine learning component such as a neural network that is trained to denoise data. The speech decoder 146 may include a diffusion model such as a denoising diffusion probabilistic model configured to convert a noise signal to spectrograms based on a conditioning input. A denoising diffusion probabilistic model is a parameterized Markov chain trained to gradually denoise data to reconstruct the desired data. A denoising diffusion probabilistic model may operate in two stages. In a first stage, which does not change, Gaussian noise may be gradually added to audio data (e.g., the target data 135) until the resulting data is pure (or nearly pure) Gaussian noise. In a second stage, a neural network (e.g., the diffusion model) may be trained to gradually denoise the data until some audio data is reconstructed (e.g., the predicted spectrogram data 485). Example operations for training the speech decoder 146 are discussed below with reference to FIGS. 7A and 7B.

In some implementations, the speech decoder 146 may receive voice embedding data 465 as an additional conditioning input for generating the predicted spectrogram data 485. A voice encoder 460 may generate the voice embedding data 465 from a piece of reference audio data 415. The voice encoder 460 may be a machine learning component such as a neural network. In some implementations, the voice encoder 460 may be the same type of model as the prosody encoder 450. The voice encoder 460 may be a pretrained component such as is used for speaker identification. In some implementations, however, the voice encoder 460 may be trained in conjunction with the speech decoder 146 and/or other components of the system 100 to represent speaker-dependent voice characteristics of the reference audio data 415 while suppressing (e.g., disentangling) the prosodic characteristics. In some implementations, the voice encoder 460 may be trained using, for example, contrastive learning such that the voice encoder 460 generates voice embedding data 465 that are close (e.g., as measured using cosine similarity) for respective clips of reference audio data 415 corresponding to a same speaker, but that are distant for respective clips of reference audio data 415 corresponding different speakers.

In some cases, the system 100 may generate the prosody embedding data 455 and voice embedding data 465 from a same piece of reference audio data 415. In some cases, the system 100 may generate the prosody embedding data 455 from a first piece of reference audio data 415*a* generate the voice embedding data 465 from a second piece of reference audio data 415*b* different from the first piece (e.g., representing a different speaker and/or a different tone of voice). Therefore, and due to the training of the separate models, the speech model 144 may model the prosodic characteristics of the synthesized speech while the speech decoder 146 may model the voice characteristics. Although the system 100 may be trained with a goal of disentangling prosodic characteristics and voice characteristics, in operation there may be some overlap in the information contained in the prosody embedding data 455 and voice embedding data 465. For example, the prosody embedding data 455 may primarily represent prosodic characteristics of the reference audio data 415 and the voice embedding data 465 may primarily represent voice characteristics of the reference audio data 415. In some cases, however, the prosody embedding data 455 may include some information related to voice characteristics and the voice embedding data 465 may include some information related to prosodic characteristics. Nevertheless, the prosody encoder 450 may encode separate pieces of reference audio data 415 (e.g., corresponding to different speakers) such that the output audio primarily reflects the prosodic characteristics of the first speaker and the voice characteristics of the second speaker. In some implementations, the system 100 may be configured to select voice embedding data 465 for a given prosody embedding data 455, or vice-versa; for example, by using a trained model. Using a trained model to select the prosody embedding data 455 and/or the voice embedding data 465 may ease the speech style selection process for the user.

A vocoder 148 may convert the predicted spectrogram data 485 to audio waveform data 195 (e.g., an analog or digital time-domain waveform) suitable for amplification and output via a loudspeaker (e.g., the loudspeaker 1012 of a user device 110) as an audible signal. The vocoder 148 may be, for example, a universal neural vocoder based on Parallel WaveNet or related model. The vocoder 148 may take as input audio data in the form of, for example, a Mel-spectrogram with 80 coefficients and frequencies ranging from 50 Hz to 12 kHz. The audio waveform data 195 may be a time-domain audio format (e.g., pulse-code modulation (PCM), waveform audio format (WAV), u-law, etc.) that may be readily converted to an analog signal for amplification and output by a loudspeaker. The audio waveform data 195 may consist of, for example, 8-, 16-, or 24-bit audio having a sample rate of 16 kHz, 24 kHz, 44.1 kHz, etc. In some implementations, other bit and/or sample rates may be used. The speech synthesis system 100 may include more or fewer components without departing from the scope of this disclosure. In some implementations, the speech decoder 146 (and/or other component of the system 100 such as the NLG component 879) may generate other output data including, for example, indications or instructions for handling and/or outputting the synthesized speech. For example, the input data 145/155 and/or other input data may be received along with metadata, such as SSML tags, indicating that a selected portion of the input data 145/155 should be louder or quieter. Thus, the other output data may include a volume tag that instructs the vocoder 148 to increase or decrease an amplitude of the output speech audio waveform data 195 at times corresponding to the selected portion of the input data 145/155. Additionally or alternatively, a volume tag may instruct a playback device (e.g., a user device 110) to raise or lower a volume of the synthesized speech from the device's current volume level, or lower a volume of other media being output by the device (e.g., to deliver an urgent message).

Once the speech synthesis system 100 has processed the input data 145/155 and generated some output data, the robustness testing component 150 may receive some output data 165, calculate a loss, and generate model update data 175 for updating one or more speech generation model(s) 140 of the system 100. In various implementations, the output data 165 may represent different data generated by the system 100 including the speech token data 475, the predicted spectrogram data 485, and/or the audio waveform data 195. The type of output data 165 used to train the speech generation model(s) 140 may depend on the training goals and/or which particular speech generation model(s) 140 are being updated.

For example, when training the text encoder 142 and/or the speech model 144, the robustness testing component 150 may compare speech token data 475 output by the speech model 144 to speech token data generated from the target data 135. A speech tokenizer 440 may process the target data 135 to generate target speech token data. The speech tokenizer 440 may be trained as described below with reference to FIG. 5. Training in this manner may conserve computing resources as less processing is needed to generate the speech token data 475 (e.g., without further processing by the speech decoder 146 and/or vocoder 148). Furthermore, calculate a loss based on a comparison of speech token data (instead of spectrogram or waveform data) may require fewer computing resources. Another benefit may be the ability to train the speech model 144 separately from the speech decoder 146.

In some implementations, however, the robustness testing component 150 may update the speech generation model(s) based on a loss calculated using the predicted spectrogram data 485 or the audio waveform data 195. Training the system 100 in a more end-to-end manner may improve the quality of synthesized speech.

Figure 5:
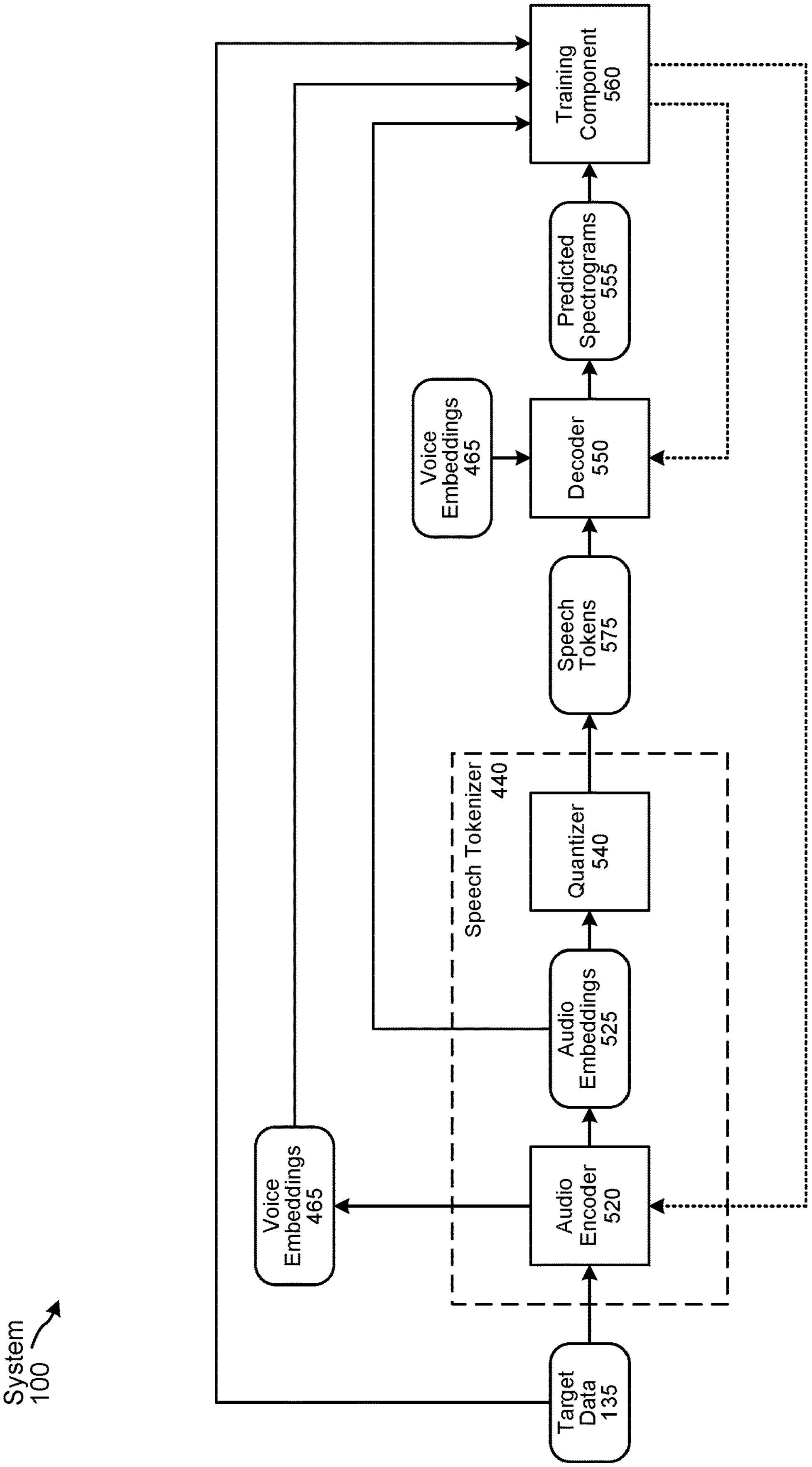
FIG. 5 is a conceptual diagram illustrating example operations for training a speech tokenizer of the system, according to embodiments of the present disclosure.

FIG. 5 is a conceptual diagram illustrating example operations for training a speech tokenizer 440 of the system, according to embodiments of the present disclosure. The speech tokenizer 440 may include an audio encoder 520 and a quantizer 540 configured to process target data 135 (e.g., spectrogram data) to generate speech token data 575. A decoder 550 may process the speech token data 575 to generate predicted spectrogram data 555. The audio encoder 520 and the decoder 550 shown in FIG. 5 may form an autoencoder configuration. An autoencoder may be used to learn latent representations of unlabeled data. The encoding function may process the input data to generate latent representations, and the decoding function may process the latent representations to reconstruct the input data. The reconstructed data may be compared to the input data, and the parameters of the encoder and decoder updated to improve the accuracy of the reconstruction.

The audio encoder 520 may process the target data 135 and output audio embedding data 525 that represents an encoded version of the speech represented in the target data 135. The audio embedding data 525 may include continuous or discrete values that represent the content and prosody of speech in the target data 135. The speech tokenizer 440 may additionally include a quantizer 540. The quantizer 540 may quantize the values of the audio embedding data 525 into a finite set of discrete, representative vectors (e.g., centroids). The representative vectors may make up the speech tokens of the speech token data 575. Quantizing the speech representations into speech tokens in this manner may reduce the computing resources required by the speech model 144 when predicting speech token data 575. In some implementations, the components shown in FIG. 5 may be configured as a vector quantized variational autoencoder (VQ-VAE). In various implementations, a speech token may correspond to a portion of audio; for example, 1, 2, 4, 8, 16 frames of audio data, etc. (e.g., where each frame of audio data corresponds to approximately 40 ms of audio; however, a spectrogram may represent a frame of audio having a longer or shorter duration). In various implementations, a speech token may be an integer having a value between zero and 2047, 4095, 16383, 32767, etc. Hyperparameters such as these may be selected to achieve a desired balance between speed, computing resources, and accuracy of the reconstruction. The speech token data 575 learned through these training operations represent the "vocabulary" of content and prosody that the system 100 may model using the speech model 144.

During training, the target data 135 may be from a corpus containing speech samples from multiple different speakers (e.g., the training dataset 105 and/or the parallel training dataset 115). In some implementations, the decoder 550 may use voice embedding data 465 generated by the voice encoder 460 (e.g., as discussed above with reference to FIG. 4) as a conditioning input for reconstructing the predicted spectrogram data 555. The voice encoder 460 may generate voice embedding data 465 for the different speakers represented in the corpus (e.g., using the target data 135 corresponding to one or more of the speech samples for that speaker). In this manner, the speech tokenizer 440 may be trained to generate a representation of the speech that retains its prosodic characteristics and content, but not other acoustic features such speaker-dependent voice characteristics and, in some cases, recording conditions such as reverberation, noise, etc. Instead, the speaker-dependent voice characteristics may be conveyed using the voice embedding data 465 and, in some cases, may be selected separately from the prosodic characteristics when using the system 100 to generate synthesized speech. In this manner, the voice encoder 460 may be trained to partially or fully suppress information about speaker-dependent voice characteristics and recording conditions from being encoded in the speech token data 575.

In some implementations, however, the audio encoder 520 may be trained to generate both the voice embedding data 465 and the audio embedding data 525. Training the audio encoder 520 to generate both the voice embedding data 465 and the audio embedding data 525 may allow the system 100 to better disentangle speaker-dependent voice characteristics (represented in the voice embedding data 465) from content and prosody characteristics (represented in the audio embedding data 525). In some implementations, the audio encoder 520 may include a pretrained model configured for self-supervised learning such as a WaveLM.

The training may be accomplished four stages; however, more or fewer stages may be used without departing from the scope of this disclosure. In a first stage, the audio encoder 520 may be trained to generate similar or same voice embedding data 465 for speech samples from the same speaker. In the first stage, a training component 560 may receive voice embedding data 465 generated by the audio encoder 520 when processing target data 135 representing speech samples from the same speaker, and update the audio encoder 520 to reduce the contrastive loss among those samples.

In a second stage, the audio encoder 520 may be trained to generate different voice embedding data 465 for speech samples from different speakers. In the second stage, the training component 560 may receive voice embedding data 465 generated by the audio encoder 520 when processing target data 135 representing speech samples from different speakers, and update the audio encoder 520 to increase the difference between voice embedding data 465 corresponding to different speakers.

In a third stage, the audio encoder 520 may be trained to increase a difference between the voice embedding data 465 and audio embedding data 525 generated for a same speech sample In the third stage, the training component 560 may receive voice embedding data 465 and audio embedding data 525 generated by the audio encoder 520 from a single piece of target data 135, and update the audio encoder 520 to increase the difference between voice embedding data 465 and the audio embedding data 525.

Finally, the training component 560 calculate a reconstruction loss by comparing the predicted spectrogram data 555 to the target data 135 (e.g., using mean-square-error, cross-correlation, binary cross-entropy, etc.) and use backpropagation to update parameters of the audio encoder 520 (and/or the decoder 550).

FIG. 6 is a conceptual diagram illustrating example operations for training the speech model 144, according to embodiments of the present disclosure. The speech model 144 may be trained using a corpus that may include target data 135 and input data 145 representing a transcript of speech in the target data 135. The corpus may also include reference audio data 415, which may be taken from the target data 135, or may otherwise represent the speech of one or more of the speakers included in the corpus. The speech tokenizer 440 (e.g., trained as described above with reference to FIG. 5) may be used to generate target speech token data 575 for training the speech model 144.

The speech model 144 may process text embedding data 435 (e.g., generated by the text encoder 142 using the input data 145) and prosody embedding data 455 (e.g., generated by the prosody encoder 450 using the reference audio data 415) and generate predicted speech token data 475. A training component 660 may compare the predicted speech token data 475 to the target speech token data 575 (e.g., using mean-square-error, cross-correlation, binary cross-entropy, etc.) to determine a reconstruction loss and use backpropagation to update parameters of the speech model 144 (and, in some cases, the prosody encoder 450). In some implementations, the training component 660 may update parameters of the text encoder 142 as well. In such cases, the text encoder 142 and the speech model 144 may be trained together to improve the performance of their combined operations in generating predicted speech token data 475 that match the target speech token data 575 generated by the speech tokenizer 440. In various implementations, the training component 660 may be the same as, or different from, the training component 560 used in training the speech tokenizer 440 as shown in FIG. 5.

During this training, the speech model 144 may receive the prosody embedding data 455 as a conditioning input for a given sequence of text embedding data 435. Accordingly, the prosody encoder 450 may be trained to isolate the prosodic characteristics of the speaker(s) represented in the training corpus. Similarly, the speech model 144 may be trained to emulate, in the predicted speech token data 475, the prosodic characteristics conveyed in the prosody embedding data 455. At runtime, the system 100 may generate synthesized speech based on user selected and/or generated prosody embedding data 455. In this manner, the system 100 may allow the user to choose the prosodic characteristics of the speech.

Figure 7A:
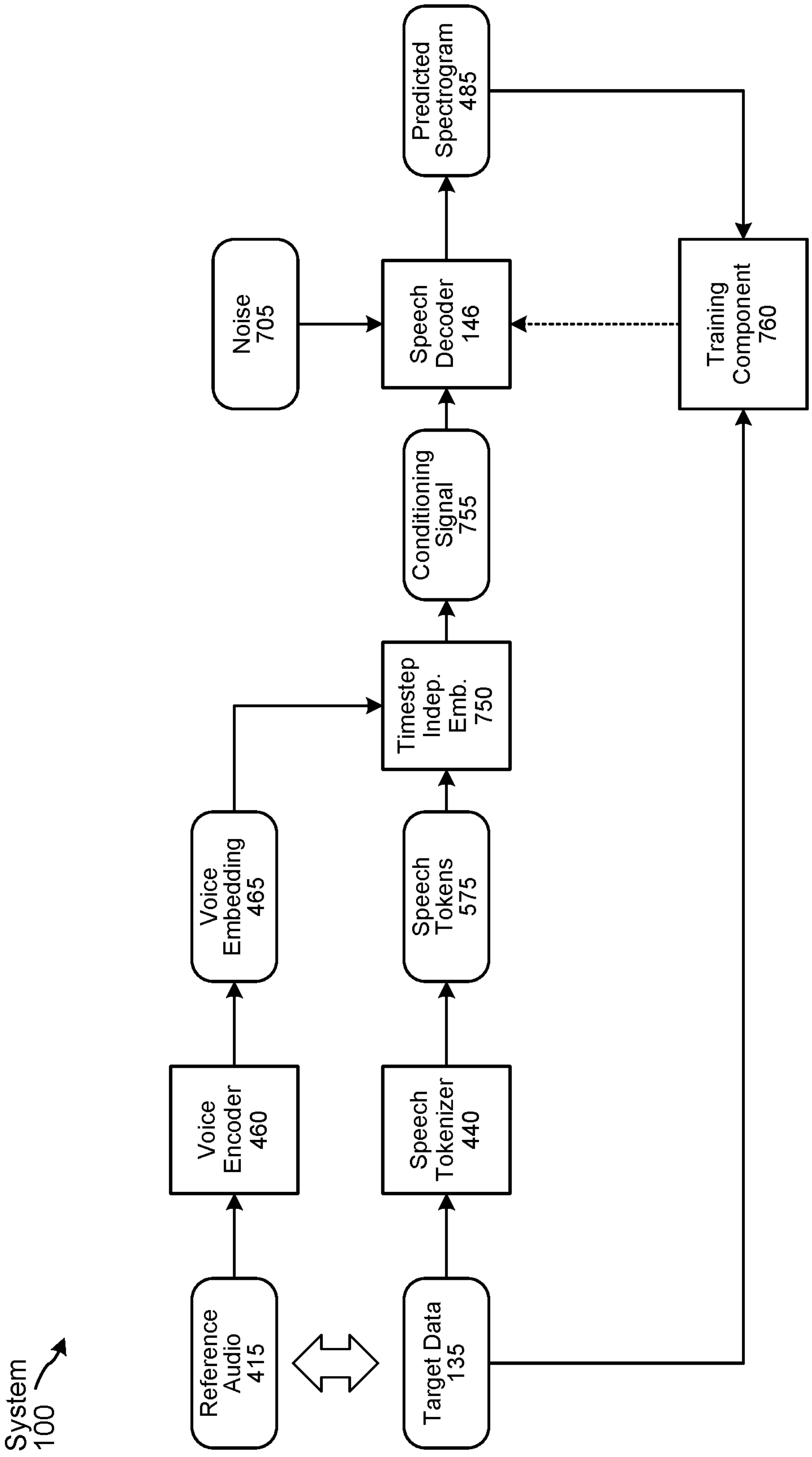
FIG. 7A is a conceptual diagram illustrating example operations for training a speech decoder of the system, according to embodiments of the present disclosure.

FIG. 7A is a conceptual diagram illustrating example operations for training the speech decoder 146, according to embodiments of the present disclosure. Training of the speech decoder 146 may follow training of the speech tokenizer 440 as shown in FIG. 5, where the more powerful speech decoder 146 replaces the decoder 550. The speech tokenizer may be used to generate speech token data 575 corresponding to the target data 135. In some implementations, a voice encoder 460 may generate voice embedding data 465 from the reference audio data 415 as shown in FIG. 4. In some implementations, the voice embedding data 465 may be generated by the audio encoder 520 as shown in FIG. 5. The voice embedding data 465 may represent voice characteristics (and, in some cases, recording conditions such as room tone, reverberations, echoes, etc. that make the output audio sound more natural).

A timestamp independent embedding 750 may be used to encode the speech token data 575 and the voice embedding data 465 into a conditioning signal 755. The speech decoder 146 may use the conditioning signal 755 to reconstruct predicted spectrogram data 485 from a noise signal 705. The noise signal 705 may have a dimensionality consistent with that of the desired output (e.g., the predicted spectrogram data 485) but whose values are random or pseudo randomly generated to approximate a Gaussian distribution of values. A training component 760 may compare the predicted spectrogram data 485 to the target data 135 (e.g., using mean-square-error, cross-correlation, binary cross-entropy, etc.) to determine a loss and use backpropagation to update parameters of the speech decoder 146. In this manner, the speech decoder 146 may be trained to gradually denoise the noise signal 705 to reconstruct the predicted spectrogram data 485. In some implementations, the training component 760 may be the same as, or different from, the training component 560 used in the speech tokenizer training described in FIG. 5.

Figure 7B:
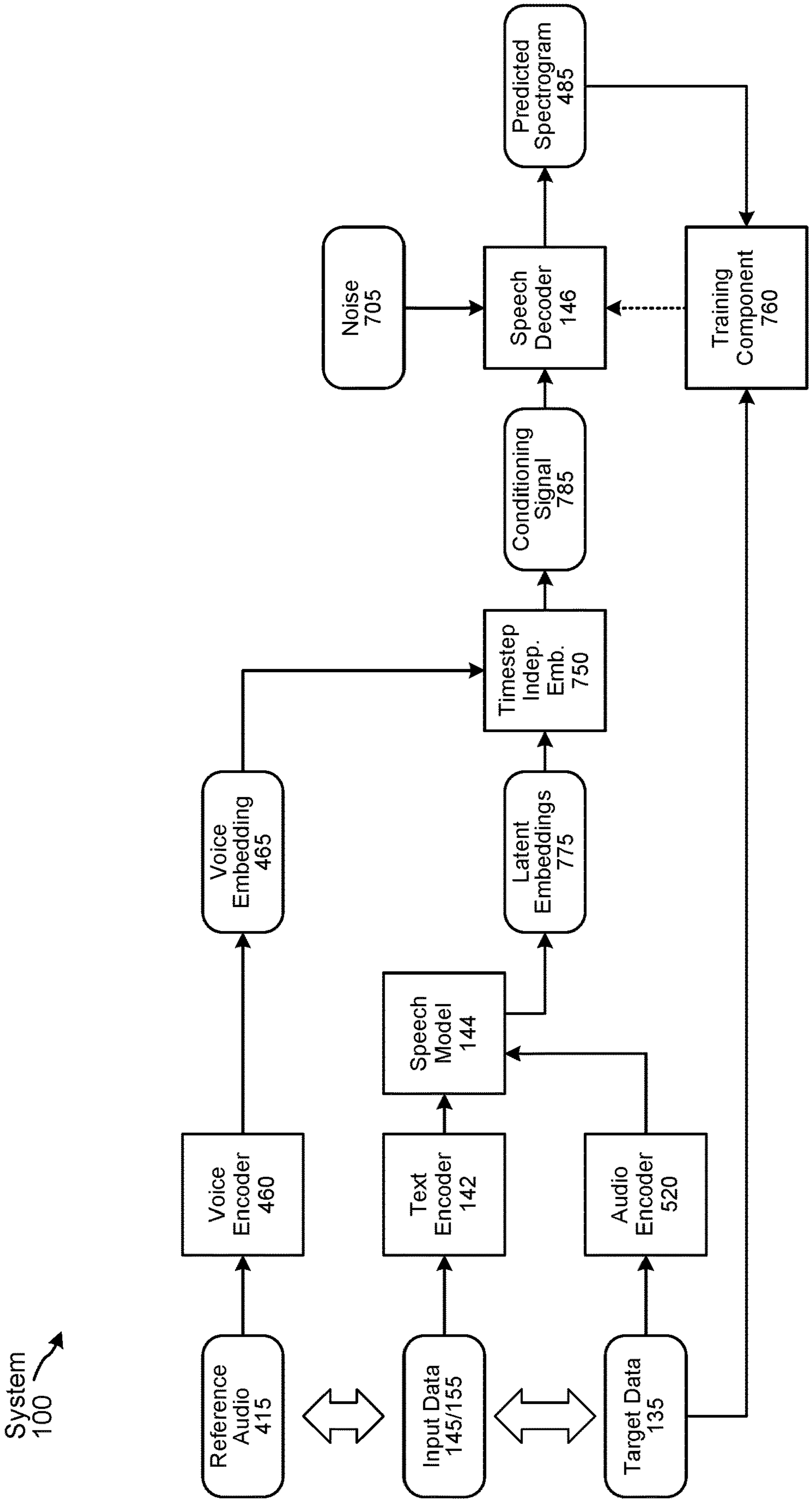
FIG. 7B is a conceptual diagram illustrating example operations for training a speech decoder of the system, according to embodiments of the present disclosure.

FIG. 7B is a conceptual diagram illustrating example operations for finetuning the speech decoder 146, according to embodiments of the present disclosure. Fine tuning of the speech decoder 146 may follow training of the speech model 144 as shown in FIG. 6. While the training operations shown in FIG. 7A involve using the speech decoder 146 to process a conditioning signal 755 generated from audio data (e.g., the target data 135), finetuning may involve using the speech decoder 146 to process a conditioning signal 785 generated from the input data 145/155. This may improve the runtime performance of the speech decoder 146 when it generates predicted spectrogram data 485 based on speech token data 475.

In some implementations, rather than using the speech token data 475 output by the speech model 144, finetuning may involve using latent embedding data 775 from a last transformer layer of the speech model 144 (e.g., before a linear projection layer that may project the latent embedding data 775 into speech token data 475). For example, the speech model 144 may have an architecture configured to receive both text embeddings (e.g., from the text encoder 142) and speech embeddings (e.g., from the audio encoder 520). The speech model 144 may use the text embeddings and speech embeddings to generate both predicted text embeddings and predicted speech embeddings. In some runtime operations, the speech model 144 may predict text embeddings and speech embeddings from only text embeddings (or only speech embeddings). During finetuning, the speech model 144 may predict speech embeddings based on both the received text embeddings and speech embeddings (e.g., while the predicted text embeddings may not be used). Thus, during finetuning, the speech model 144 may process text embeddings and speech embedding to generate the latent embedding data 775. The latent embedding data 775 may represent predicted speech embedding data prior to projection into the speech token data 475.

The timestamp independent embedding 750 may encode the latent embedding data 775 and the voice embedding data 465 into a conditioning signal 785. The latent embedding data 775 may be much more semantically rich (e.g., may convey more information regarding content and/or prosody of the input data 145) than the discrete speech token data 475. Thus, finetuning the speech decoder 146 using the more information rich latent embedding data 775/conditioning signal 785 may improve the efficiency of the speech decoder 146 and/or result in improvements in phoneme accuracy and overall audio quality.

As in FIG. 7A, the speech decoder 146 may use the conditioning signal 785 to reconstruct predicted spectrogram data 485 from a noise signal 705. A training component 760 may compare the predicted spectrogram data 485 to the target data 135 (e.g., using mean-square-error, cross-correlation, binary cross-entropy, etc.) to determine a loss and use backpropagation to update parameters of the speech decoder 146. In this manner, the speech decoder 146 may be trained to gradually denoise the noise signal 705 to reconstruct the predicted spectrogram data 485. In some implementations, the training component 760 may be the same as, or different from, the training component 560 used in the speech tokenizer training described in FIG. 5.

FIG. 8 is a conceptual diagram of components of a system 800 that incorporates the speech synthesis system 100, according to embodiments of the present disclosure. The speech synthesis system 100 may operate as, for example, part of the TTS component 880 of the system 800; for example, the speech synthesis system 100 may synthesize speech outputs to a user as part of a voice user interface of a virtual assistant system. The speech synthesis system 100 may also convert other types of content to synthesized speech to, for example, read messages, articles, books, etc. for a user. The system 800 may have broad applications from, for example, reading a book out loud, allowing hands-free/eyes-free operation of the user device 110 (e.g., such as when driving a car), reading documents to the vision impaired, dubbing television or movies based on subtitles and/or closed captions, reading emails, etc. Thus, the system 800 may be called upon to synthesize speech from noisy input data in a broad range of contexts, from content recognized optically based on image data 15 captured by the user device 110, to text messages received from friends and family.

The various components may be located on same or different physical devices. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system component(s). In at least some embodiments, such determination may be made using a wakeword detection component 820. The wakeword detection component 820 may be configured to detect various wakewords. In at least some examples, each wakeword may correspond to a name of a different digital assistant. An example wakeword/digital assistant name is "Alexa." In another example, input to the system may be in form of text data 13, for example as a result of a user typing an input into a user interface of device 110. Other input forms may include indication that the user has pressed a physical or virtual button on device 110, the user has made a gesture, etc. The device 110 may also capture images using camera(s) 1018 of the device 110 and may send image data 15 representing those image(s) to the system component(s). The image data 15 may include raw image data or image data processed by the device 110 before sending to the system component(s). The image data 15 may be used in various manners by different components of the system to perform operations such as determining whether a user is directing an utterance to the system, interpreting a user command, responding to a user command, etc.

The wakeword detection component 820 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 820 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 820 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 820 and/or input is detected by an input detector, the device 110 may "wake" and begin generating audio data 811 based on the audio 11, using an audio front end (AFE) 822. The AFE 822 may include hardware and/or software for digitizing the audio 11 and, in some cases, performing digital signal processing such as noise and/or echo cancellation. The audio data 811 may include data corresponding to the wakeword; in other embodiments, the portion of the audio corresponding to the wakeword is removed by the device 110 prior to sending the audio data 811 to the system component(s) 120. In the case of touch input detection or gesture-based input detection, the audio data may not include a wakeword.

In some implementations, the system 800 may include more than one system component(s). The system component(s) 120 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 820 may result in sending audio data to system component(s) for processing while detection of the wakeword "Computer" by the wakeword detector may result in sending audio data to system component(s) b for processing. The system may have a separate wakeword and system for different skills/systems (e.g., "Dungeon Master" for a game play skill/system component(s) c) and/or such skills/systems may be coordinated by one or more skill component(s) 890 of one or more system component(s) 120.

Upon receipt by the system component(s) 120, the audio data 811 may be sent to an orchestrator component 830. The orchestrator component 830 may include memory and logic that enables the orchestrator component 830 to transmit various pieces and forms of data to various components of the system, as well as perform other operations as described herein.

The orchestrator component 830 may send the audio data 811 to language processing components 892. The language processing components 892 (sometimes also referred to as a spoken language understanding (SLU) component) includes an automatic speech recognition (ASR) component 850 and a natural language understanding (NLU) component 860. The ASR component 850 may transcribe the audio data 811 into text data. The text data output by the ASR component 850 represents one or more than one (e.g., in the form of an N-best list) ASR hypotheses representing speech represented in the audio data 811. The ASR component 850 interprets the speech in the audio data 811 based on a similarity between the audio data 811 and pre-established language models. For example, the ASR component 850 may compare the audio data 811 with models for sounds (e.g., acoustic units such as phonemes, senons, phones, etc.) and sequences of sounds to identify words that match the sequence of sounds of the speech represented in the audio data 811. The ASR component 850 sends the text data generated thereby to an NLU component 860, via, in some embodiments, the orchestrator component 830. The text data sent from the ASR component 850 to the NLU component 860 may include a single top-scoring ASR hypothesis or may include an N-best list including multiple top-scoring ASR hypotheses. An N-best list may additionally include a respective score associated with each ASR hypothesis represented therein.

The language processing components 892 may further include a NLU component 860. The NLU component 860 may receive the text data from the ASR component. The NLU component 860 may attempts to make a semantic interpretation of the phrase(s) or statement(s) represented in the text data input therein by determining one or more meanings associated with the phrase(s) or statement(s) represented in the text data. The NLU component 860 may determine an intent representing an action that a user desires be performed and may determine information that allows a device (e.g., the device 110, the system component(s) 120, a skill component 890, a skill system component(s) 125, etc.) to execute the intent. For example, if the text data corresponds to "play the 5$^{th}$ Symphony by Beethoven," the NLU component 860 may determine an intent that the system output music and may identify "Beethoven" as an artist/composer and "5th Symphony" as the piece of music to be played. For further example, if the text data corresponds to "what is the weather," the NLU component 860 may determine an intent that the system output weather information associated with a geographic location of the device 110. In another example, if the text data corresponds to "turn off the lights," the NLU component 860 may determine an intent that the system turn off lights associated with the device 110 or the user. However, if the NLU component 860 is unable to resolve the entity—for example, because the entity is referred to by anaphora such as "this song" or "my next appointment"—the language processing components 892 can send a decode request to other language processing components for information regarding the entity mention and/or other context related to the utterance. The language processing components 892 may augment, correct, or base results data upon the audio data 811 as well as any data received from the other language processing components.

The NLU component 860 may return NLU results data (which may include tagged text data, indicators of intent, etc.) back to the orchestration component 830. The orchestration component 830 may forward the NLU results data to a skill component(s) 890. If the NLU results data includes a single NLU hypothesis, the NLU component 860 and the orchestrator component 830 may direct the NLU results data to the skill component(s) 890 associated with the NLU hypothesis. If the NLU results data includes an N-best list of NLU hypotheses, the NLU component 860 and the orchestrator component 830 may direct the top scoring NLU hypothesis to a skill component(s) 890 associated with the top scoring NLU hypothesis. The system 800 may also include a post-NLU ranker which may incorporate other information to rank potential interpretations determined by the NLU component 860.

A skill component 890 may be software running on the system component(s) 120 that is akin to a software application. That is, a skill component 890 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 890*a*, 890*b*, 890*c*, etc. (collectively "skill components 890"). For example, a book skill component may provide book content to the speech synthesis system 100 for output to the user as synthesized speech (e.g., "read" the book to the user), a weather service skill component may enable the system component(s) 120 to provide weather information, a car service skill component may enable the system component(s) 120 to book a trip with respect to a taxi or ride sharing service, etc. A skill component 890 may operate in conjunction between the system component(s) 120 and other devices, such as the device 110, in order to complete certain functions. Inputs to a skill component 890 may come from speech processing interactions or through other interactions or input sources. A skill component 890 may include hardware, software, firmware, or the like that may be dedicated to a particular skill component 890 or shared among different skill components 890.

A skill system component(s) 125 may communicate with a skill component(s) 890 within the system component(s) 120 and/or directly with the orchestrator component 830 or with other components. A skill system component(s) 125 may be configured to perform one or more actions. An ability to perform such action(s) may sometimes be referred to as a "skill." That is, a skill may enable a skill system component(s) 125 to execute specific functionality in order to provide data or perform some other action requested by a user. For example, a weather service skill may enable a skill system component(s) 125 to provide weather information to the system component(s) 120, a car service skill may enable a skill system component(s) 125 to book a trip with respect to a taxi or ride sharing service, an order pizza skill may enable a skill system component(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 890 dedicated to interacting with the skill system component(s) 125. Unless expressly stated otherwise, reference to a skill, skill device, or skill component may include a skill component 890 operated by the system component(s) 120 and/or skill operated by the skill system component(s) 125. Moreover, the functionality described herein as a skill or skill may be referred to using many different terms, such as an action, bot, app, or the like. The skill component 890 and or skill system component(s) 125 may return output data to the orchestration component 830.

The system 800 may include the content delivery component 821. The content delivery component 821 may include a combination of hardware and/or software configured to provide content to a user. Such content may include, for example, books, periodicals, websites, etc. In some implementations, the content delivery component 821 may leverage the speech synthesis system 100 to "read" text content to the user. In some implementations, the content delivery component 821 may be implemented as a skill component (e.g., as one of the skill component(s) 890). In some implementations, the content delivery component 821 may be implemented as a component of the system 800 and/or as a skill support component 125. Operation of the content delivery component 821 is described in additional detail below with reference to FIG. 9.

The system component(s) includes a language output component 893. The language output component 893 includes a natural language generation (NLG) component 879 and a TTS component 880 (e.g., implementing the speech synthesis system 100). The NLG component 879 can generate text for purposes of TTS output to a user. For example, the NLG component 879 may generate text corresponding to instructions corresponding to a particular action for the user to perform. The NLG component 879 may generate appropriate text for various outputs as described herein. The NLG component 879 may include one or more trained models configured to output text appropriate for a particular input. The text output by the NLG component 879 may become input for the TTS component 880 (e.g., output text data discussed below). Alternatively or in addition, the TTS component 880 may receive text data from a skill component 890 or other system component for output.

The NLG component 879 may include a trained model. The NLG component 879 generates text data from dialog data received by the dialog manager such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG component 879 may then be generated using the TTS component 880 as previously described.

The system 800 (either on device 110, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 870 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 870 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 870 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 9:
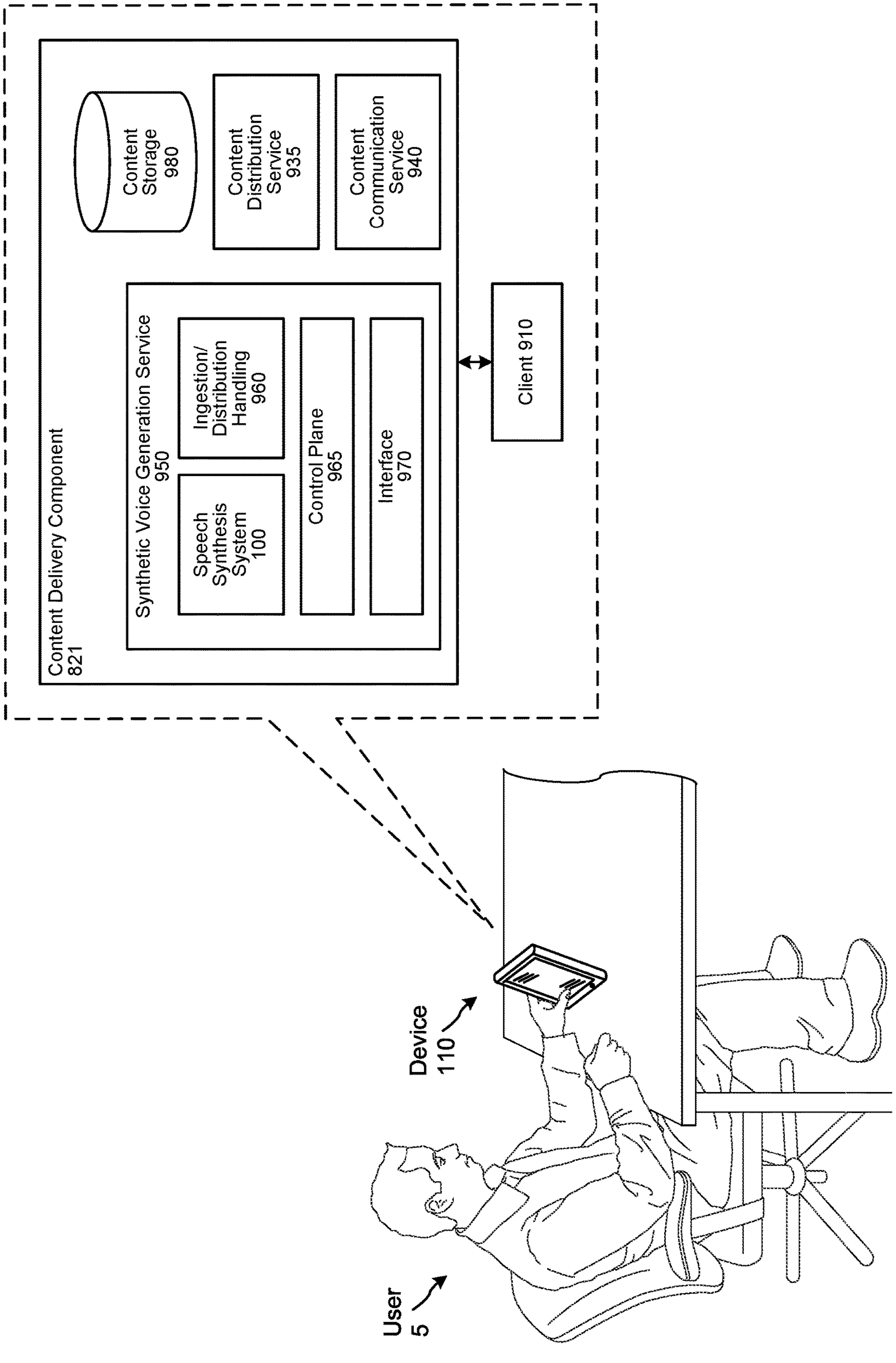
FIG. 9 illustrates an example operation of a content delivery component of the system, according to embodiments of the present disclosure.

FIG. 9 illustrates an example operation of the content delivery component 821, according to embodiments of the present disclosure. The content delivery component 821 may allow the user to interact with the system 800 to select and retrieve content for display on the user device 110 and/or output as synthesized speech from the user device 110. The user may search for, browse, and/or retrieve content via a user interface of the device 110 (e.g., a graphical user interface (GUI) and/or a voice user interface (VUI)). The content delivery component 821 may leverage the speech synthesis system 100 to "read" text content to the user. The delivery component 821 may generate synthesized speech for content on demand (e.g., in response to a user request) and/or may generate synthesized speech for content when it is received (e.g., from the publisher) and then stored in a content storage component 980 until requested by a user or users. Various functions of the content delivery component 821 may execute on the user device 110, a system component 120, or be divided and/or duplicated between the user device 110 and a system component 120. In some implementations, the user device 110 may implement a client 910 configured to interface with the content delivery component 821, which itself may reside on a system component 120.

The content delivery component 821 may include a speech synthesis system 100 that implements model-based synthetic voice generation to generate a synthetic voice associated with a user-provided description and modify various content (e.g., audio, image, text, video) to include synthetic speech spoken in the synthetic voice using techniques described herein.

In some embodiments, the content delivery component 821 may implement a content distribution service 935 (e.g., for uploading and sharing through various communication protocols uploaded content (e.g., audio, images, text, video, etc.), such as streaming videos on demand to clients 910) and content communication service 940 (e.g., a content communication service that enables live or real time content communications between two or more participants (e.g., audio, image, text, video, etc.). In some embodiments, the content delivery component 821 may include a content storage component 980 for storing various content (e.g., audio, image, text, video, etc., as discussed above) that may be distributed (e.g., via the content distribution service 935) to users (e.g., via clients 910) in response to a user request for the content. In other embodiments, the content delivery component 821 may be in communication with a system which includes the storage. Clients 910 may access these various services offered by the content delivery component 821 via one or more computer network(s) 199. Likewise, network-based services may themselves communicate and/or make use of one another to provide different services. For example, various clients of the speech synthesis system 100 may be implemented within another service or system of the content delivery component 821, such as content distribution service 935, which may provide synthetic voice generation of content (e.g., audio, image, text, video, etc.) for distribution and/or content communication service 940.

The synthetic voice generation service 950 may provide versions of source content that replaces audio portions spoken in a first voice with generated audio portions in a second synthetic voice. In some embodiments, the speech synthesis system 100 may be used to provide versions of source content that adds generated audio portions spoken in a synthetic voice corresponding to the source content. In some embodiments, the synthetic voice generation service 950 may provide versions of source content that may further include facial image data to match the newly generated synthetic audio (e.g., may add facial image data to match the newly generated synthetic audio or may modified facial image data in the source content to match the newly generated synthetic audio). The synthetic voice generation service 950 may offer various features, such as synthetic voice generation services for content used in video communications, gaming, etc.

The synthetic voice generation service 950 may implement interface 970, which supports various interactions with speech synthesis system 100. For example, in some embodiments, interface 970 may support various programmatic interfaces (e.g., APIs) which can request, upload, modify, receive, or direct generation of synthetic voices for source content. In some embodiments, interface 970 may include a graphical user interface (GUI), such as may be implemented as part of a web-based console. In some embodiments, interface 970 may include a command line interface (CLI).

The synthetic voice generation service 950 may implement control plane 965, in some embodiments, which may implement various control functions to manage interaction with the speech synthesis system 100, distribution handling 960, and/or other components of the synthetic voice generation service 950 that generate the synthetic voices for source content, such as dispatching or directing synthetic voice generation jobs, streams, or other assignments of synthetic voice generation processing and distribution. For example, control plane 965 may manage different pools of resources dedicated to generating synthetic voices so that resources for performing a specific synthetic voice generation task may be quickly obtained and started for synthetic voice generation.

To provide heat management, for example, control plane 965 may collect performance metrics from the various resources implementing the speech synthesis system 100 and/or ingestion/distribution handling 960. Each resource may have various thresholds for performance characteristics, such as memory utilization, CPU utilization, disk utilization, and request-rate capacity. When a resource reports metrics that exceed a threshold (or multiple thresholds), control plane 965 may direct the migration of one or more tasks to different resources to balance workloads or handle failures.

In some implementations, the speech synthesis system 100 may be distributed across one or multiple different resources (e.g., nodes, servers, or host systems) such as multiple system components 120. In various embodiments, requests to perform synthetic voice generation may be dispatched from control plane 965, which may accept as input source content from ingestion/distribution handling 960 and return a new version including the generated synthetic voice to ingestion/distribution handling 960. In some embodiments, speech synthesis system 100 may provide a function to allow for a playback device (e.g., the user device 110) to perform at least some of the computation to generate the synthetic voice version of the source content.

In some embodiments, the content delivery component 821 may modify still images and/or video associated with the content. In such implementations, the content delivery component 821 may embed or encode within the output content indications of the modifications made. For example, watermarks or other visual or audio modifications may be included to indicate the presence of modifications. In this way, when playback of the new version of the content occurs, playback applications can provide indications of what portions of the content were modified (e.g., overlay a certain color or indication on video to show portions of face that were modified or were added). Using such information, a user can turn on/off the modification indicator feature. In some embodiments, if this additional data is too large to embed in the content itself, a link to a remote resource can be provided. In various embodiments, ingestion/distribution handling 960 may provide the support for various communication protocols to receive and transmit source content and new versions of the contents. For example, one or multiple ingestion resources (e.g., nodes, servers, or host systems) may support data transfer or other communications protocols as a network target or other endpoint for receiving content from a client. In some embodiments, various preprocessing or format conversion techniques may be implemented as part of ingestion, such as various security techniques to prevent receiving or uploading malicious software. Similarly, one or multiple distribution resources (e.g., nodes, servers, or host systems) may support data transmission or other communications protocols as a data transmitter to send a new version of content to a network target (e.g., either content distribution service 935, content communication service 940 or other internal or external client 910.

Generally speaking, clients 910 may encompass any type of client configurable to submit network-based services requests to the content delivery component 821 via network(s) 199, including requests for synthetic voice generation services (e.g., a request to modify source content to include a synthetic voice, etc.). For example, a given client 910 may include a suitable version of a web browser, or may include a plug-in module or other type of code module configured to execute as an extension to or within an execution environment provided by a web browser. For further example, a given client 910 may include a user device 110. Alternatively, a client 910 may encompass an application such as a media application, an office application or any other application that may make use of synthetic voice generation services to perform techniques like audio, image, and/or video content playback. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 910 may be an application configured to interact directly with the content delivery component 821. In some embodiments, client 910 may be configured to generate network-based services requests according to a Representational State Transfer (REST)-style network-based services architecture, a document- or message-based network-based services architecture, or another suitable network-based services architecture.

Clients 910 may convey network-based services requests (e.g., synthetic voice generation requests to the speech synthesis system 100) and receive responses from the content delivery component 821 via network(s) 199. In some instances, the request may include the content for which the desired synthetic voice is to be generated (and, optionally a further description of the desired synthetic voice). Such content may include, for example, image data 15, input audio 11, and/or text data 13. In other instances, the request may identify the content for which the desired synthetic voice is to be generated (and, optionally a further description of the desired synthetic voice). For example, the request may correspond to a selection/identification, via the interface 970, of content accessible by the content delivery component 821 and a request that the content be output along with a desired synthetic voice (e.g., selection of an audio book along with a request that the narrator of the audio book sound like they are older and sad, selection of an image/video of an animated character and a request that the image/video be output along with synthetic speech spoken by a synthetic voice associated with the animated character, etc.). The content delivery component 821 may use the desired synthetic voice characteristics provided by the user to select prosody embedding data 455 and/or voice embedding data 465 for generating the synthesized speech.

The speech synthesis system 100 may receive the content (and the further description) via the control plane 965 and ingestion/distribution handling 960 (as described herein above and may process the content as described herein above with respect to FIG. 4 to generate the synthesized speech. The content delivery component 821 may then provide the new version of the content (e.g., the content including the synthetic speech spoken by the desired synthetic voice) to the client 910 via the network(s) 199.

In various embodiments, network(s) 199 may encompass any suitable combination of networking hardware and protocols necessary to establish network-based-based communications between clients 910 and the content delivery component 821. For example, network(s) 199 may generally encompass the various telecommunications networks and service providers that collectively implement the Internet. Network(s) 199 may also include private networks such as local area networks (LANs) or wide area networks (WANs) as well as public or private wireless networks. For example, both a given client 910 and the content delivery component 821 may be respectively provisioned within enterprises having their own internal networks.

In such an embodiment, network(s) 199 may include the hardware (e.g., modems, routers, switches, load balancers, proxy servers, etc.) and software (e.g., protocol stacks, accounting software, firewall/security software, etc.) necessary to establish a networking link between given client 910 and the Internet as well as between the Internet and the content delivery component 821. It is noted that in some embodiments, clients 910 may communicate with the content delivery component 821 using a private network rather than the public Internet.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 10:
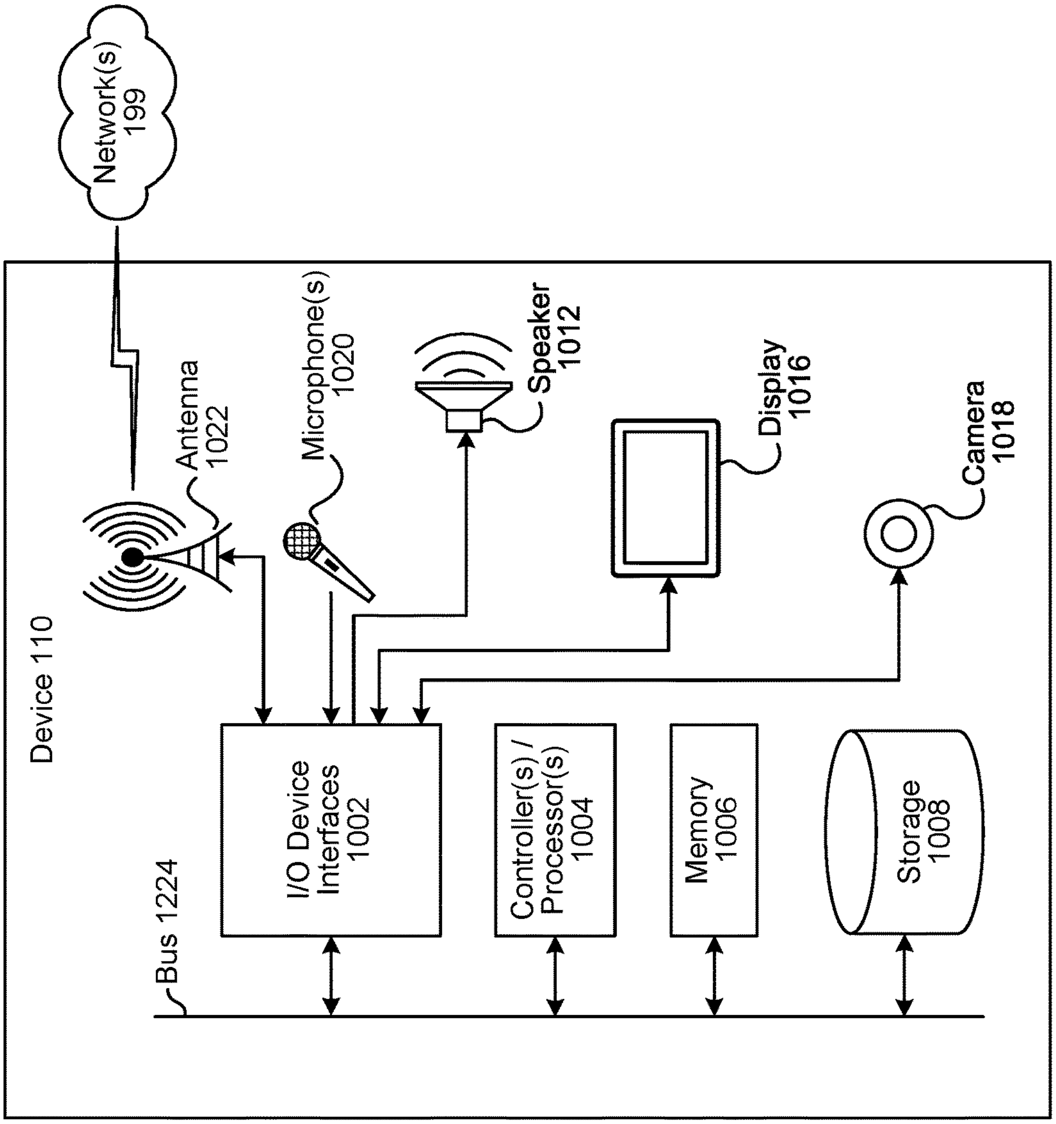
FIG. 10 is a block diagram conceptually illustrating example components of a device, according to embodiments of the present disclosure.
Figure 11:
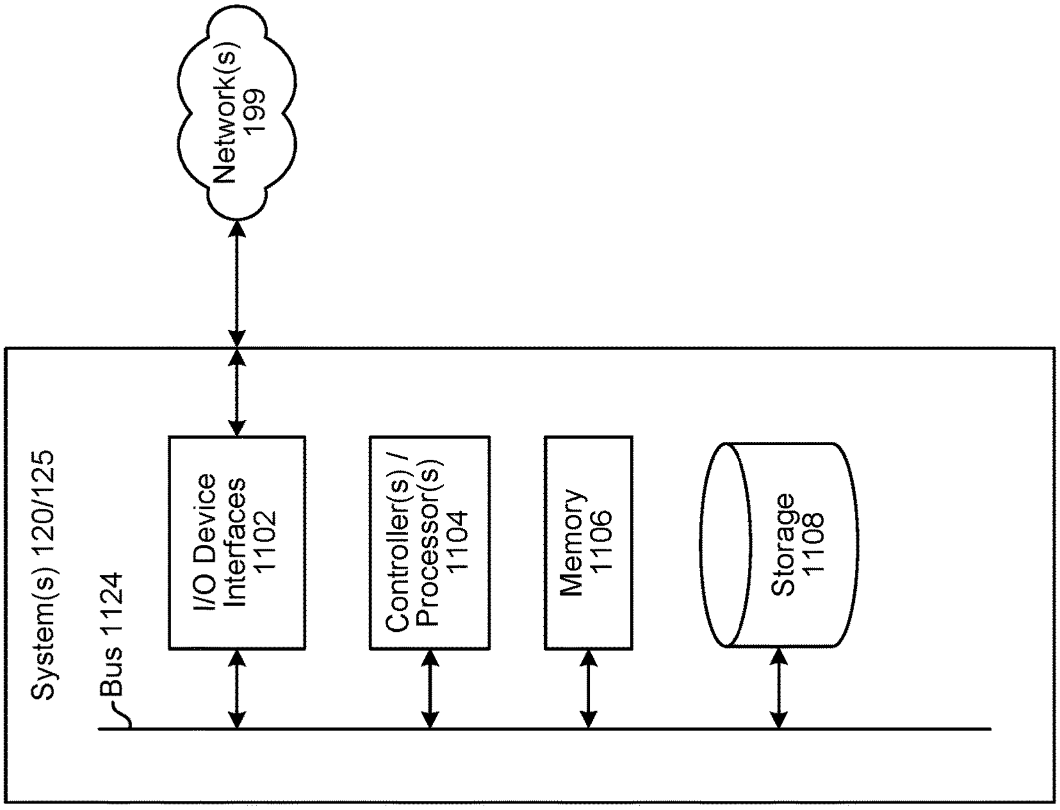
FIG. 11 is a block diagram conceptually illustrating example components of a system, according to embodiments of the present disclosure.

FIG. 10 is a block diagram conceptually illustrating a device 110 that may be used with the system. FIG. 11 is a block diagram conceptually illustrating example components of a remote device, such as the natural language command processing system component(s), which may assist with ASR processing, NLU processing, etc., and a skill system component(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system component(s) may be located remotely from the device 110 as its operations may not require proximity to the user. The server/system component(s) may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). The system component 120 may also be a version of a user device 110 that includes different (e.g., more) processing capabilities than other user device(s) 110 in a home/office. One benefit to the server/system component(s) being in a user's home/business is that data used to process a command/return a response may be kept within the user's home, thus reducing potential privacy concerns.

Multiple system components (120/125) may be included in the overall system 800 of the present disclosure, such as one or more natural language processing system component(s) 120 for performing ASR processing, one or more natural language processing system component(s) 120 for performing NLU processing, one or more skill system component(s) 125, etc. In operation, each of these systems may include computer-readable and computer-executable instructions that reside on the respective device (120/125), as will be discussed further below.

Each of these devices (110/120/125) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random-access memory (RAM), non-volatile read only memory (ROM), non-volatile magnetoresistive memory (MRAM), and/or other types of memory. Each device (110/120/125) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1002/1102).

Computer instructions for operating each device (110/120/125) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120/125) includes input/output device interfaces (1002/1102). A variety of components may be connected through the input/output device interfaces (1002/1102), as will be discussed further below. Additionally, each device (110/120/125) may include an address/data bus (1024/1124) for conveying data among components of the respective device. Each component within a device (110/120/125) may also be directly connected to other components in addition to (or instead of) being connected to other components across the bus (1024/1124).

Referring to FIG. 10, the device 110 may include input/output device interfaces 1002 that connect to a variety of components such as an audio output component such as a loudspeaker 1012, a wired headset or a wireless headset (not illustrated), or other component capable of outputting audio. The device 110 may also include an audio capture component. The audio capture component may be, for example, a microphone 1020 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1016 for displaying content. The device 110 may further include a camera 1018.

Via antenna(s) 1022, the input/output device interfaces 1002 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device(s) 110, the natural language command processing system component(s), or a skill system component(s) 125 may include their own dedicated processors, memory, and/or storage. Alternatively, one or more of the components of the device(s) 110, the natural language command processing system component(s), or a skill system component(s) 125 may utilize the I/O interfaces (1002/1102), processor(s) (1004/1104), memory (1006/1106), and/or storage (1008/1108) of the device(s) 110, natural language command processing system component(s), or the skill system component(s) 125, respectively. Thus, the ASR component 850 may have its own I/O interface(s), processor(s), memory, and/or storage; the NLU component 860 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system component(s), and a skill system component(s) 125, as described herein, are illustrative, and may be located as a stand-alone device or may be included, in whole or in part, as a component of a larger device or system. As can be appreciated, a number of components may exist either on a system component(s) 120 and/or on device 110; for example, the language processing components 892 (which may include the ASR component 850 and/or the NLU component 860), the language output components 893 (which may include the NLG component 879 and/or the TTS component 880), etc., as illustrated in FIG. 8. Unless expressly noted otherwise, the system version of such components may operate similarly to the device version of such components and thus the description of one version (e.g., the system version or the local version) applies to the description of the other version (e.g., the local version or system version) and vice-versa.

Figure 12:
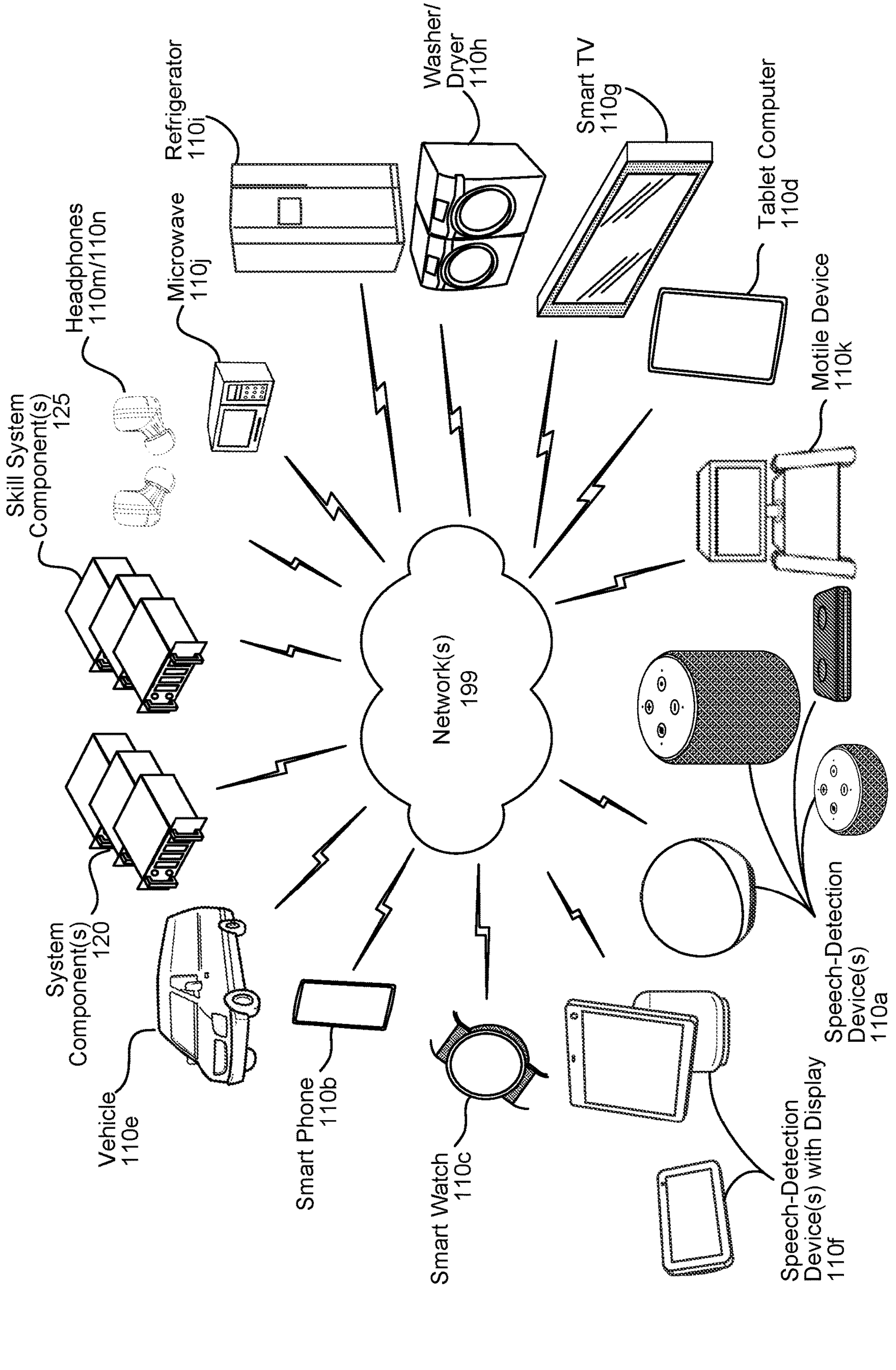
FIG. 12 illustrates an example of a computer network for use with the overall system, according to embodiments of the present disclosure.

As illustrated in FIG. 12, multiple devices (110*a*-110*n*, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a speech-detection device with display 110*f*, a display/smart television 110*g*, a washer/dryer 110*h*, a refrigerator 110*i*, a microwave 110*j*, autonomously motile device 110*k* (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 850, the NLU component 860, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer-implemented method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:

receiving a first training dataset for training a first speech generation model, the first training dataset including first audio data representing first speech and first text data representing a transcript of the first speech;

processing the first text data using the first speech generation model to generate first output data representing first synthesized speech;

determining, using the first output data and the first audio data, a second speech generation model representing an update of the first speech generation model;

processing the first text data using a text modifier component to generate second text data for a second training dataset by introducing a first plurality of spelling variations into the first text data;

processing the second text data using the second speech generation model to generate second output data representing second synthesized speech;

determining, using the second output data and the first audio data, a third speech generation model representing an update of the second speech generation model;

receiving input data representing content for generating third synthesized speech;

processing the input data using the third speech generation model to generate third output data representing the third synthesized speech; and causing a user device to output first audio representing the third output data.

2. The computer-implemented method of claim 1, further comprising:

determining, using the first output data and the first audio data, first data representing a first quality of the first synthesized speech;

processing the first text data using the second speech generation model to generate fourth output data representing fourth synthesized speech;

determining, using the fourth output data and the first audio data, second data representing a second quality of the fourth synthesized speech;

determining, using the first data and the second data, that the fourth synthesized speech has a lower quality than the first synthesized speech;

in response to determining that the fourth synthesized speech has a lower quality than the first synthesized speech, processing the first text data using the text modifier component to generate third text data for a third training dataset, the third training dataset including a second plurality of spelling variations less numerous than the first plurality of spelling variations;

processing the third text data using the second speech generation model to generate fifth output data representing fourth synthesized speech; and determining, using the fifth output data and the second speech generation model, a fourth speech generation model.

3. The computer-implemented method of claim 1, further comprising:

processing the first audio data using a first neural network audio encoder to generate first audio embedding data;

processing the first audio embedding data using a quantizer to generate first speech token data, wherein the first output data represents second speech token data; and determining first data representing a cross-entropy loss between the first speech token data and the first output data, wherein the second speech generation model is determined using the first data.

4. The computer-implemented method of claim 1, further comprising:

determining a first sentence in the transcript to modify;

determining a first truncated sentence representing a portion of the first sentence, the portion omitting at least a first word of the first sentence; and determining second audio data representing second speech corresponding to the portion of the first sentence, wherein the second training dataset includes the first truncated sentence and the second audio data.

5. A computer-implemented method comprising:

receiving first input data representing first content for generating first synthesized speech, the first input data representing at least a first word having a first spelling error;

operating a first speech generation model trained using a first training dataset that includes first audio data representing first speech and second input data representing a first transcript of the first speech modified, prior to training of the first speech generation model, to introduce at least a second spelling error to a second word, wherein the first audio data represents a correct pronunciation of the second word without the second spelling error;

processing the first input data using the first speech generation model to generate first output data representing a correct pronunciation of the first word without the first spelling error; and causing a user device to output first audio representing the first output data.

6. The computer-implemented method of claim 5, further comprising:

receiving a second training dataset for training a second speech generation model, the second training dataset including the first audio data and third input data representing a second transcript of the first speech;

determining the second input data by modifying a spelling of at least a third word of the third input data; and determining the first speech generation model by training the second speech generation model using the second training dataset and the first training dataset, the first speech generation model representing an update of the second speech generation model.

7. The computer-implemented method of claim 6, further comprising:

determining a third training dataset having a higher number of modifications than the first training dataset;

determining a third speech generation model using the third training dataset and the first speech generation model, the third speech generation model representing an update of the first speech generation model;

determining first loss data using an evaluation dataset and the first speech generation model;

determining second loss data using the evaluation dataset and the third speech generation model; and determining, using the first loss data and the second loss data, to generate a fourth training dataset having a lower number of modifications than the third training dataset.

8. The computer-implemented method of claim 6, further comprising:

processing the first audio data using a first neural network audio encoder to generate first audio embedding data;

determining first data representing a quantized version of the first audio embedding data;

processing the second input data using the second speech generation model to determine second output data; and determining second data representing a cross-entropy loss between the first data and the second output data, wherein the first speech generation model is determined using the second data.

9. The computer-implemented method of claim 5, further comprising:

receiving a second training dataset including the first audio data and third input data representing a second transcript of the first speech;

determining a first sentence in the third input data to modify;

determining a portion of the first audio data corresponding to the first sentence;

determining a second sentence by modifying punctuation of the first sentence; and determining the first training dataset using the second sentence and the portion of the first audio data.

10. The computer-implemented method of claim 5, further comprising:

receiving a second training dataset including the first audio data and third input data representing a second transcript of the first speech;

determining a first word in the third input data to modify;

determining, using a dataset of commonly misspelled words, a second word representing a misspelling of the first word; and determining the second input data using the second word in place of the first word.

11. The computer-implemented method of claim 5, further comprising:

receiving a second training dataset including the first audio data and third input data representing a second transcript of the first speech;

determining a first sentence in the third input data to modify;

determining a second sentence representing a portion of the first sentence;

determining second audio data corresponding to the portion of the first sentence; and determining the first training dataset using the second sentence and the second audio data.

12. A system, comprising:

at least one processor; and at least one memory comprising instructions that, when executed by the at least one processor, cause the system to:

receive first input data representing first content for generating first synthesized speech, the first input data representing at least a first word having a first spelling error;

operate a first speech generation model trained using a first training dataset that includes first audio data representing first speech and second input data representing a first transcript of the first speech modified, prior to training of the first speech generation model, to introduce at least a second spelling error to a second word, wherein the first audio data represents a correct pronunciation of the second word without the second spelling error;

process the first input data using the first speech generation model to generate first output data representing a correct pronunciation of the first word without the first spelling error; and cause a user device to output first audio representing the first output data.

13. The computer-implemented method of claim 5, further comprising:

receiving a second training dataset including the first audio data and third input data representing a second transcript of the first speech;

determining a first sentence in the third input data to modify;

determining a portion of the first audio data corresponding to the first sentence;

determining a second sentence by inserting a line break in the first sentence; and determining the first training dataset using the second sentence and the portion of the first audio data.

14. The system of claim 12, wherein the at least one memory further comprises instructions that, when executed by the at least one processor, further cause the system to:

receive a second training dataset for training a second speech generation model, the second training dataset including the first audio data and third input data representing a second transcript of the first speech;

determine the second input data by modifying a spelling of at least a third word of the third input data; and determine the first speech generation model by training the second speech generation model using the second training dataset and the first training dataset, the first speech generation model representing an update of the second speech generation model.

15. The system of claim 14, wherein the at least one memory further comprises instructions that, when executed by the at least one processor, further cause the system to:

determine a third training dataset having a higher number of modifications than the first training dataset;

determine a third speech generation model using the third training dataset and the first speech generation model, the third speech generation model representing an update of the first speech generation model;

determine first loss data using an evaluation dataset and the first speech generation model;

determine second loss data using the evaluation dataset and the third speech generation model; and determine, using the first loss data and the second loss data, to generate a fourth training dataset having a lower number of modifications than the third training dataset.

16. The system of claim 14, wherein the at least one memory further comprises instructions that, when executed by the at least one processor, further cause the system to:

process the first audio data using a first neural network audio encoder to generate first audio embedding data;

determine first data representing a quantized version of the first audio embedding data;

process the second input data using the second speech generation model to determine second output data; and determine second data representing a cross-entropy loss between the first data and the second output data, wherein the first speech generation model is determined using the second data.

17. The system of claim 12, wherein the at least one memory further comprises instructions that, when executed by the at least one processor, further cause the system to:

receive a second training dataset including the first audio data and third input data representing a second transcript of the first speech;

determine a first sentence in the third input data to modify;

determine a portion of the first audio data corresponding to the first sentence;

determine a second sentence by modifying punctuation of the first sentence; and determine the first training dataset using the second sentence and the portion of the first audio data.

18. The system of claim 12, wherein the at least one memory further comprises instructions that, when executed by the at least one processor, further cause the system to:

receive a second training dataset including the first audio data and third input data representing a second transcript of the first speech;

determine a first word in the third input data to modify;

determine, using a dataset of commonly misspelled words, a second word representing a misspelling of the first word; and determine the second input data using the second word in place of the first word.

19. The system of claim 12, wherein the at least one memory further comprises instructions that, when executed by the at least one processor, further cause the system to:

receive a second training dataset including the first audio data and third input data representing a second transcript of the first speech;

determine a first sentence in the third input data to modify;

determine a second sentence representing a portion of the first sentence;

determine second audio data corresponding to the portion of the first sentence; and determine the first training dataset using the second sentence and the second audio data.

20. The system of claim 12, wherein the at least one memory further comprises instructions that, when executed by the at least one processor, further cause the system to:

receive a second training dataset including the first audio data and third input data representing a second transcript of the first speech;

determine a first sentence in the third input data to modify;

determine a portion of the first audio data corresponding to the first sentence;

determine a second sentence by inserting a line break in the first sentence; and determine the first training dataset using the second sentence and the portion of the first audio data.

* * * * *